(12) United States Patent
Aoki

(10) Patent No.: US 12,547,190 B2
(45) Date of Patent: Feb. 10, 2026

(54) CONTROL SYSTEM, AND CONTROL METHOD

(71) Applicant: DENSO CORPORATION, Kariya (JP)

(72) Inventor: Takashi Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 18/747,274

(22) Filed: Jun. 18, 2024

(65) Prior Publication Data

US 2024/0338039 A1 Oct. 10, 2024

Related U.S. Application Data

(63) Continuation of application No. PCT/JP2022/045358, filed on Dec. 8, 2022.

(30) Foreign Application Priority Data

Dec. 21, 2021 (JP) ................. 2021-207404

(51) Int. Cl.
G05D 1/65 (2024.01)
B60L 15/20 (2006.01)
B60L 58/10 (2019.01)
G05D 1/646 (2024.01)
G05D 109/10 (2024.01)
G05D 111/50 (2024.01)

(52) U.S. Cl.
CPC ............... *G05D 1/65* (2024.01); *B60L 15/20* (2013.01); *B60L 58/10* (2019.02); *G05D 1/646* (2024.01); *B60L 15/2036* (2013.01); *B60L 2240/12* (2013.01); *B60L 2240/22* (2013.01); *G05D 2109/10* (2024.01); *G05D 2111/50* (2024.01)

(58) Field of Classification Search
CPC ...... G05D 1/65; G05D 2111/50; G05D 1/646; G05D 2109/10; B60L 2240/12; B60L 2240/22; B60L 15/20; B60L 15/2036; B60L 58/10
See application file for complete search history.

(56) References Cited

U.S. PATENT DOCUMENTS

2007/0007262 A1 1/2007 Aimi et al.
2022/0227354 A1* 7/2022 Hagiwara ............. B60T 8/1755

FOREIGN PATENT DOCUMENTS

JP 2008-129695 A 6/2008
JP 2017-019265 A 1/2017

* cited by examiner

*Primary Examiner* — Rodney A Butler
(74) *Attorney, Agent, or Firm* — Maschoff Brennan

(57) ABSTRACT

An autonomous travelling robot switches between a straight running and turning according to a rotation speed difference between a pair of drive wheels driven by individual electric actuators supplied electric power from a battery, along a target trajectory. The autonomous travelling robot is controlled by monitoring a running restriction that includes an electric power restriction of the battery; and restricting a maximum turning speed, which is a maximum speed when turning with a minimum turning radius, to be smaller than a maximum straight-running speed, which is a maximum speed when straight-running, according to an establishment of a condition in the running restriction.

8 Claims, 12 Drawing Sheets

CONTROL SYSTEM, AND CONTROL METHOD

CROSS REFERENCE TO RELATED APPLICATION

The present application is a continuation application of International Patent Application No. PCT/JP2022/045358 filed on Dec. 8, 2022, which designated the U.S. and claims the benefit of priority from Japanese Patent Application No. 2021-207404 filed on Dec. 21, 2021. The entire disclosures of all of the above applications are incorporated herein by reference.

TECHNICAL FIELD

The present disclosure relates to a control technique for controlling an autonomous travelling robot.

BACKGROUND

A conceivable technique describes a technique for controlling an autonomous travelling robot that switches between straight-running travel and turning travel according to the rotation speed difference between a pair of drive wheels driven by individual electric actuators, and is controlled along a path as a target trajectory.

SUMMARY

According to an example, an autonomous travelling robot switches between a straight running and turning according to a rotation speed difference between a pair of drive wheels driven by individual electric actuators supplied electric power from a battery, along a target trajectory. The autonomous travelling robot may be controlled by monitoring a running restriction that includes an electric power restriction of the battery; and restricting a maximum turning speed, which is a maximum speed when turning with a minimum turning radius, to be smaller than a maximum straight-running speed, which is a maximum speed when straight-running, according to an establishment of a condition in the running restriction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
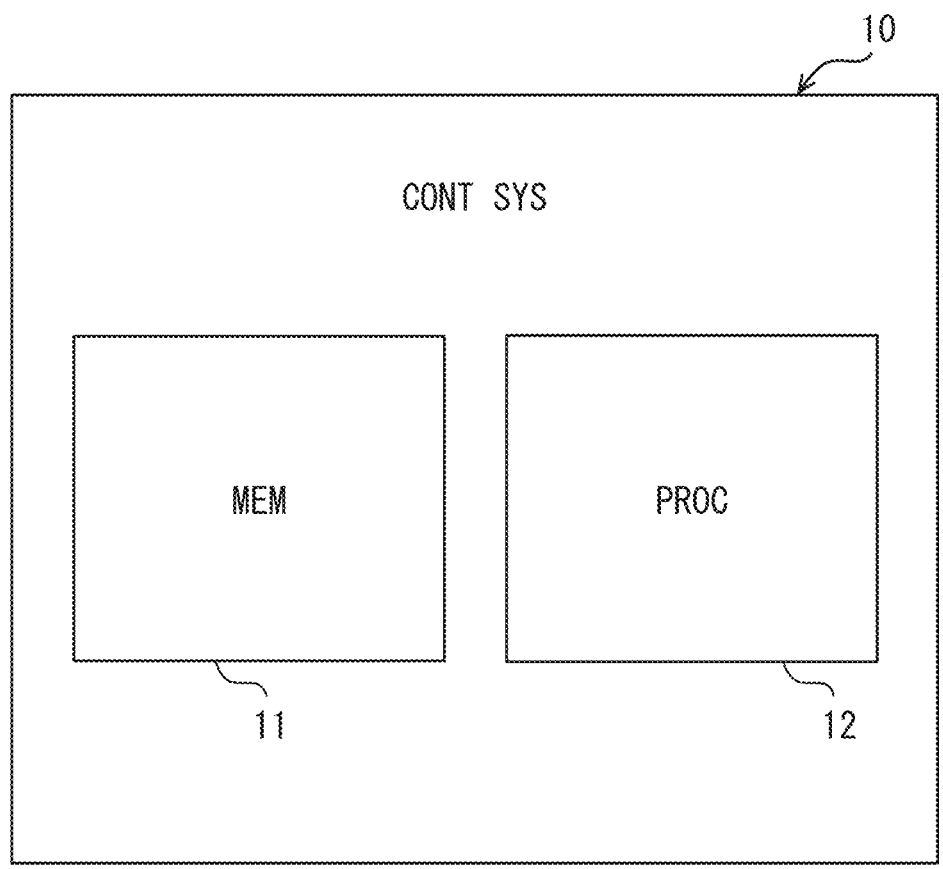
FIG. 1 is a block diagram illustrating an overall configuration of a control system according to an embodiment.

In an electric autonomous travelling robot such as the technology according to the conceivable technique, it is necessary to operate individual electric actuators that drive each drive wheel using electric power supplied from a battery. However, since there are restrictions on the electric power that can be supplied to the battery mounted on the autonomous travelling robot depending on the amount of charge, there are also restrictions on the rotation speed of each drive wheel. As a result, especially when turning, the drive wheel on the side that increases the rotation speed is restricted, and there is a risk that the actual trajectory that the autonomous travelling robot actually follows may deviate from the target trajectory.

The present embodiments provide a control system that suppresses trajectory deviation of an autonomous travelling robot. Another object of the present disclosure is to provide a control device that suppresses trajectory deviation of an autonomous travelling robot. Another object of the present disclosure is to provide a control method for suppressing trajectory deviation of an autonomous travelling robot. Another object of the present disclosure is to provide a control program that suppresses trajectory deviation of an autonomous travelling robot.

The following will describe technical solutions of the present embodiments for solving the above objects.

According to a first aspect of the present embodiments, a control system for controlling an autonomous travelling robot, which is switched between straight-running travel and turning travel according to a rotation speed difference between a pair of drive wheels driven by individual electric actuators supplied an electric power from a battery, along a target trajectory, the control system includes: a processor. The processor is configured to execute:

monitoring a running restriction including a battery power restriction; and restricting a maximum turning speed, which is a maximum speed when turning with a minimum turning radius, to be smaller than a maximum straight-running speed, which is a maximum speed when running straight, in accordance with an establishment condition of the running restriction.

According to a second aspect of the present embodiments, a control device for controlling an autonomous travelling robot, which is switched between straight-running travel and turning travel according to a rotation speed difference between a pair of drive wheels driven by individual electric actuators supplied an electric power from a battery, along a target trajectory, the control device is mounted on the autonomous travelling robot and includes: a processor. The processor is configured to execute:

monitoring a running restriction including a battery power restriction; and restricting a maximum turning speed, which is a maximum speed when turning with a minimum turning radius, to be smaller than a maximum straight-running speed, which is a maximum speed when running straight, in accordance with an establishment condition of the running restriction.

According to a third aspect of the present embodiments, a control method for controlling an autonomous travelling robot, which is switched between straight-running travel and turning travel according to a rotation speed difference between a pair of drive wheels driven by individual electric actuators supplied an electric power from a battery, along a target trajectory, the control method is executed by a processor and includes:

monitoring a running restriction including a battery power restriction; and restricting a maximum turning speed, which is a maximum speed when turning with a minimum turning radius, to be smaller than a maximum straight-running speed, which is a maximum speed when running straight, in accordance with an establishment condition of the running restriction.

According to a fourth aspect of the present embodiments, a control program for controlling an autonomous travelling robot, which is switched between straight-running travel and turning travel according to a rotation speed difference between a pair of drive wheels driven by individual electric actuators supplied an electric power from a battery, along a target trajectory, the control program is stored in a storage medium and includes instructions executed by a processor. The instructions include:

monitoring a running restriction including a battery power restriction; and restricting a maximum turning speed, which is a maximum speed when turning with a minimum turning radius, to be smaller than a maximum straight-running speed, which is a maximum speed when running straight, in accordance with an establishment condition of the running restriction.

According to these first to fourth aspects, the drive restriction including the battery power restriction is monitored, and the maximum turning speed at the minimum turning radius is restricted to be smaller than the maximum straight-running speed depending on the establishment condition of the drive restriction. According to this, even if the electric power restriction occurs, it is possible to generate the rotation speed difference between each drive wheel so that an actual trajectory of the autonomous travelling robot follows the target trajectory, while outputting a restricted speed when turning. Therefore, it is possible to suppress the trajectory deviation of the autonomous travelling robot regardless of the electric power supply state of the battery.

According to a fifth aspect of the present embodiments, a control system for controlling an autonomous travelling robot, which is switched between straight-running travel and turning travel according to a rotation speed difference between a pair of drive wheels driven by individual electric actuators supplied an electric power from a battery, along a target trajectory, the control system includes: a processor. The processor is configured to execute:

monitoring a running restriction including a battery power restriction; and restricting a maximum turning acceleration, which is a maximum acceleration when turning with a minimum turning radius, to be smaller than a maximum straight-running acceleration, which is a maximum acceleration when running straight, in accordance with an establishment condition of the running restriction.

According to a sixth aspect of the present embodiments, a control device for controlling an autonomous travelling robot, which is switched between straight-running travel and turning travel according to a rotation speed difference between a pair of drive wheels driven by individual electric actuators supplied an electric power from a battery, along a target trajectory, the control device is mounted on the autonomous travelling robot and includes: a processor. The processor is configured to execute:

monitoring a running restriction including a battery power restriction; and restricting a maximum turning acceleration, which is a maximum acceleration when turning with a minimum turning radius, to be smaller than a maximum straight-running acceleration, which is a maximum acceleration when running straight, in accordance with an establishment condition of the running restriction.

According to a seventh aspect of the present embodiments, a control method for controlling an autonomous travelling robot, which is switched between straight-running travel and turning travel according to a rotation speed difference between a pair of drive wheels driven by individual electric actuators supplied an electric power from a battery, along a target trajectory, the control method is executed by a processor and includes:

monitoring a running restriction including a battery power restriction; and restricting a maximum turning acceleration, which is a maximum acceleration when turning with a minimum turning radius, to be smaller than a maximum straight-running acceleration, which is a maximum acceleration when running straight, in accordance with an establishment condition of the running restriction.

According to an eighth aspect of the present embodiments, a control program for controlling an autonomous travelling robot, which is switched between straight-running travel and turning travel according to a rotation speed difference between a pair of drive wheels driven by individual electric actuators supplied an electric power from a battery, along a target trajectory, the control program is stored in a storage medium and includes instructions executed by a processor. The instructions include:

monitoring a running restriction including a battery power restriction; and restricting a maximum turning acceleration, which is a maximum acceleration when turning with a minimum turning radius, to be smaller than a maximum straight-running acceleration, which is a maximum acceleration when running straight, in accordance with an establishment condition of the running restriction.

According to these fifth to eighth aspects, the drive restriction including the battery power restriction is monitored, and the maximum turning acceleration at the minimum turning radius is restricted to be smaller than the maximum straight-running acceleration depending on the establishment condition of the drive restriction. According to this, even if the electric power restriction occurs, it is possible to generate the rotation speed difference between each drive wheel so that an actual trajectory of the autonomous travelling robot follows the target trajectory, while outputting a restricted acceleration when turning. Therefore, it is possible to suppress the trajectory deviation of the autonomous travelling robot regardless of the electric power supply state of the battery.

Hereinafter, an embodiment of the present disclosure will be described with reference to the drawings.

Figure 2:
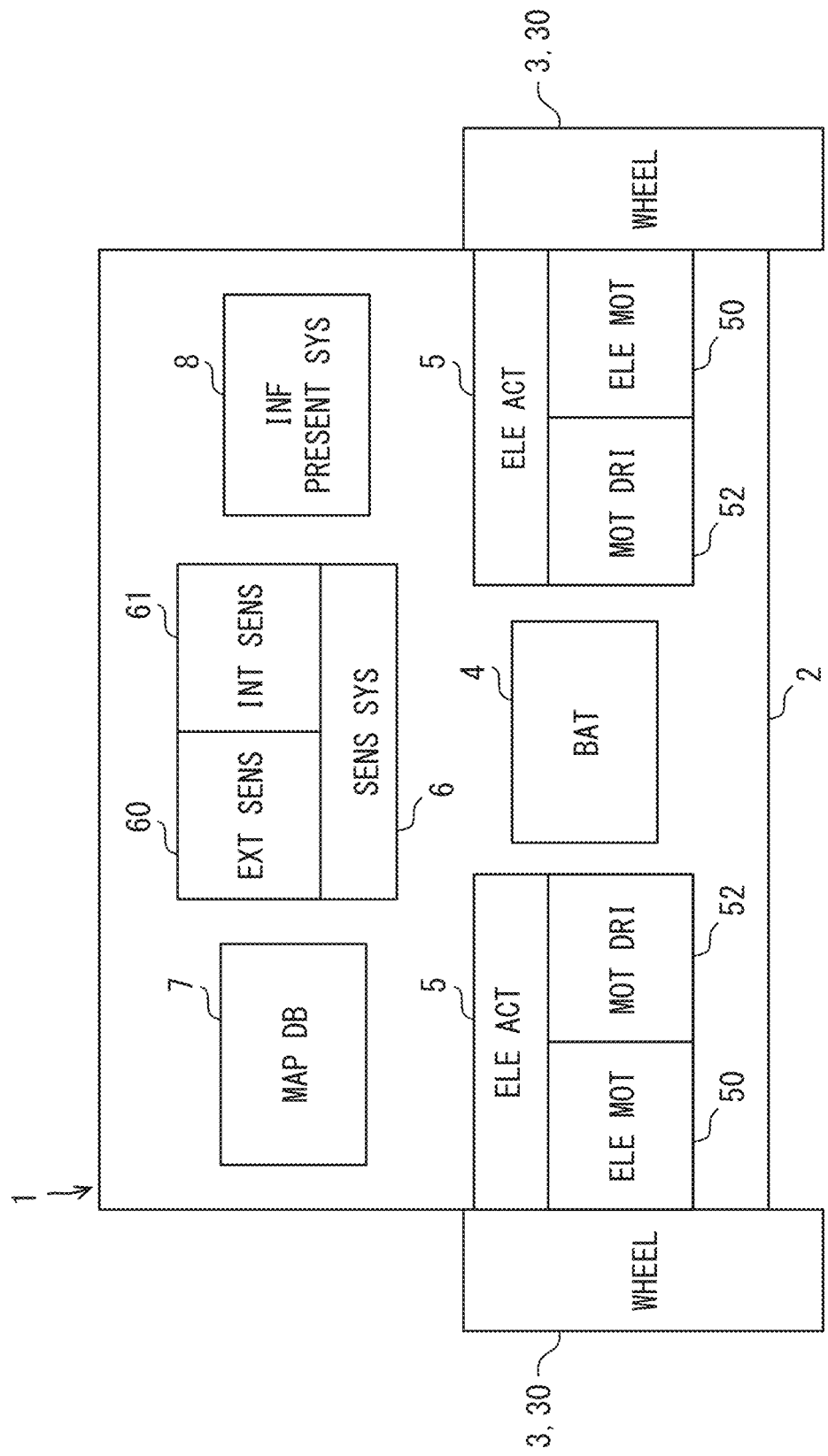
FIG. 2 is a block diagram showing the configuration of an autonomous traveling robot to which an embodiment is applied.

A control system 10 according to an embodiment shown in FIG. 1 controls an autonomous travelling robot 1 shown in FIG. 2. The autonomous travelling robot 1 autonomously travels in any direction such as front, back, left, or right directions. The autonomous travelling robot 1 may be a delivery robot that autonomously travels on roads to deliver packages. The autonomous robot 1 may be a logistics robot that autonomously travels inside and outside of a warehouse to transport cargo. The autonomous travelling robot 1 may be a disaster relief support robot that autonomously travels around a disaster area to transport supplies or collect information. Here, the autonomous travelling robot 1 may be a robot other than the above robots. Further, any type of autonomous travelling robot 1 may receive remote travel support or travel control from an external sensor.

The autonomous travelling robot 1 includes a vehicle body 2, a wheels 3, a battery 4, an electric actuator 5, a sensor system 6, a map database 7 and an information presentation system 8. The vehicle body 2 is made of, for example, metal and has a hollow shape.

A plurality of wheels 3 are supported by the vehicle body 2. Each wheel 3 is configured to be rotatable independently. Among the plurality of wheels 3, a pair of drive wheels 30, one on each side of the vehicle body 2, are independently driven by individual electric actuators 5, respectively. Depending on the rotation speed difference (that is, the rotation speed difference per unit time) between these driving wheels 30, the running state of the autonomous travelling robot 1 is switched between straight running travel and turning travel. Specifically, the autonomous travelling robot 1 runs straight in a range where the rotation speed difference between the drive wheels 30 is zero or a range where the rotation speed difference is substantially zero. On the other hand, in a range where the rotation speed difference between the driving wheels 30 increases, the turning radius of the autonomous travelling robot 1 during the turning travel decreases in accordance with the increase in the rotation speed difference. The turning radius herein means the distance between the vertical center line of the vehicle body 2 and the turning center of the turning travel. Here, the plurality of wheels 3 may include at least one driven wheel that rotates following the driving wheel 30.

The battery 4 is mounted within the vehicle body 2. The battery 4 mainly includes a storage battery such as a lithium ion battery, for example. The battery 4 stores electric power to be supplied to electric components in the vehicle body 2 by discharging, and by charging from an external device. The battery 4 may store regenerated electric power from the electric actuator 5. The battery 4 is connected via a wire harness to an electric actuator 5, a sensor system 6, a map database 7, and an information presentation system 8 to which the electric power is supplied so as to be able to supply electric power.

A pair of electric actuators 5 are mounted within the vehicle body 2. Each electric actuator 5 mainly includes a set of an electric motor 50 and a motor driver 52. In each electric actuator 5, the electric motor 50 rotates and drives the corresponding drive wheel 30 independently. In each electric actuator 5, the motor driver 52 controls the current applied to the electric motor 50 in the corresponding set according to the current command value from the control system 10, so that the motor driver 52 generates the rotation speed (i.e., the number of rotations per unit time) of the corresponding drive wheel 30 according to the current command value. Each electric actuator 5 may include a brake unit that applies braking to the corresponding drive wheel 30 during rotation. Each electric actuator 5 may include a lock unit that locks the corresponding drive wheel 30 while stopped.

The sensor system 6 acquires sensing information usable by the control system 10 by sensing the external environment and the internal environment in the autonomous travelling robot 1. For this purpose, the components of the sensor system 6 are mounted at multiple locations on the vehicle body 2. Specifically, the sensor system 6 includes an external sensor 60 and an internal sensor 61.

The external sensor 60 acquires external environment information as sensing information from the external environment that is the surrounding environment of the autonomous travelling robot 1. The external sensor 60 acquires the external environment information by detecting an object existing in the external environment of the autonomous travelling robot 1. The external sensor 60 of the object detection type is at least one of a camera, a LIDAR (i.e., Light Detection and Ranging/Laser Imaging Detection and Ranging), a radar, a sonar, and the like, for example.

The external sensor 60 may acquire the external environment information by receiving positioning signals from artificial satellites of GNSS (i.e., Global Navigation Satellite System) disposed in the external environment of the autonomous travelling robot 1. The positioning type external sensor 60 is, for example, a GNSS receiver or the like. The external sensor 60 may acquire the external environment information by transmitting and receiving communication signals to and from a V2X system existing in the external environment of the autonomous travelling robot 1. The communication type external sensor 60 is, for example, at least one of a DSRC (Dedicated Short Range Communications) communication device, a cellular V2X (C-V2X) communication device, a Bluetooth (registered trademark) device, a Wi-Fi (registered trademark) device, and an infrared communication device, for example.

The internal sensor 61 acquires the internal environment information as sensing information from the internal environment that is the internal environment of the autonomous travelling robot 1. The internal sensor 61 acquires the internal environment information by detecting a specific physical quantity of motion in the internal environment of the autonomous travelling robot 1. The physical quantity detection type internal sensor 61 is of a plurality of types including, for example, at least a speed sensor, an acceleration sensor, and a yaw rate sensor.

The map database 7 stores map information usable by the control system 10. The map database 7 includes at least one type of non-transitory tangible storage medium of, for example, a semiconductor memory, a magnetic medium, an optical medium, and the like. The map database 7 may be a database of a locator that estimates self-state quantities including the self-position of the autonomous travelling robot 1. The map database 7 may be a database of a planning unit that plans the travel of the autonomous travelling robot 1. The map database 7 may be a combination of such databases.

The map database 7 acquires and stores the latest map information, for example, through communication with an external center. Here, the map information is converted into two-dimensional data or three-dimensional data as information representing the running environment of the autonomous travelling robot 1. Digital data of a high definition map may be adopted as the three-dimensional map data. The map information may include road information representing at least one of the position, shape, road surface condition, and the like of the road itself. The map information may include traffic sign information representing at least one of the position and shape of traffic signs and lane markings attached to roads, for example. The map information may include, for example, structure information representing at least one of the positions and shapes of buildings and traffic lights facing roads.

The information presentation system 8 presents notification information to people around the autonomous travelling robot 1. The information presentation system 8 may present notification information by stimulating the vision of people around it. The visual stimulation type information presentation system 8 is, for example, at least one type of a monitor unit, a light emitting unit, or the like. The information presentation system 8 may present notification information by stimulating the auditory of people around it. The auditory stimulation type information presentation system 8 is, for example, at least one of a speaker, a buzzer, a vibration unit, and the like.

The control system 10 shown in FIG. 1 includes at least one dedicated computer, mainly as a computer mounted on the vehicle body 2. Therefore, the dedicated computer constituting the control system 10 is connected to the battery 4, the electric actuator, a sensor system 6, a map database 7, and an information presentation system 8 shown in FIG. 2 via at least one of LAN (i.e, Local Area Network), a wire harness, an inner bus, a wireless communication line and the like.

The dedicated computer configuring the control system 10 in FIG. 1 may be a planning ECU (Electronic Control Unit) that plans a target trajectory for the autonomous travelling 1 to travel. The dedicated computer constituting the control system 10 may be a trajectory control ECU that controls the actual trajectory of the autonomous travelling robot 1 to follow the target trajectory. The dedicated computer configuring the control system 10 may be an actuator ECU that controls the electric actuator 5 of the autonomous travelling robot 1. The dedicated computer constituting the control system 10 may be a sensing ECU that controls the sensor system 6 of the autonomous travelling robot 1. The dedicated computer constituting the control system 10 may be a locator ECU that estimates self-state quantities including the self-position of the autonomous travelling robot 1 based on the map database 7. The dedicated computer configuring the control system 10 may be a display ECU that controls the information presentation system 8 of the autonomous travelling robot 1. The dedicated computer that constitutes the control system 10 may be a computer outside the vehicle body 2 that constitutes an external center or a mobile terminal that can communicate via the communication type external sensor 60, for example.

The dedicated computer constituting the control system 10 includes at least one memory 10 and at least one processor 12. The memory 11 is at least one type of non-transitory tangible storage medium, such as a semiconductor memory, a magnetic medium, and an optical medium, for storing, in non-transitory manner, computer readable programs and data. The processor 12 includes at least one type of, for example, a CPU (i.e., Central Processing Unit), a GPU (i.e., Graphics Processing Unit), a RISC (i.e., Reduced Instruction Set Computer)-CPU, a DFP (i.e., Data Flow Processor), a GSP (i.e., Graph Streaming Processor), or the like as a core.

Figure 3:
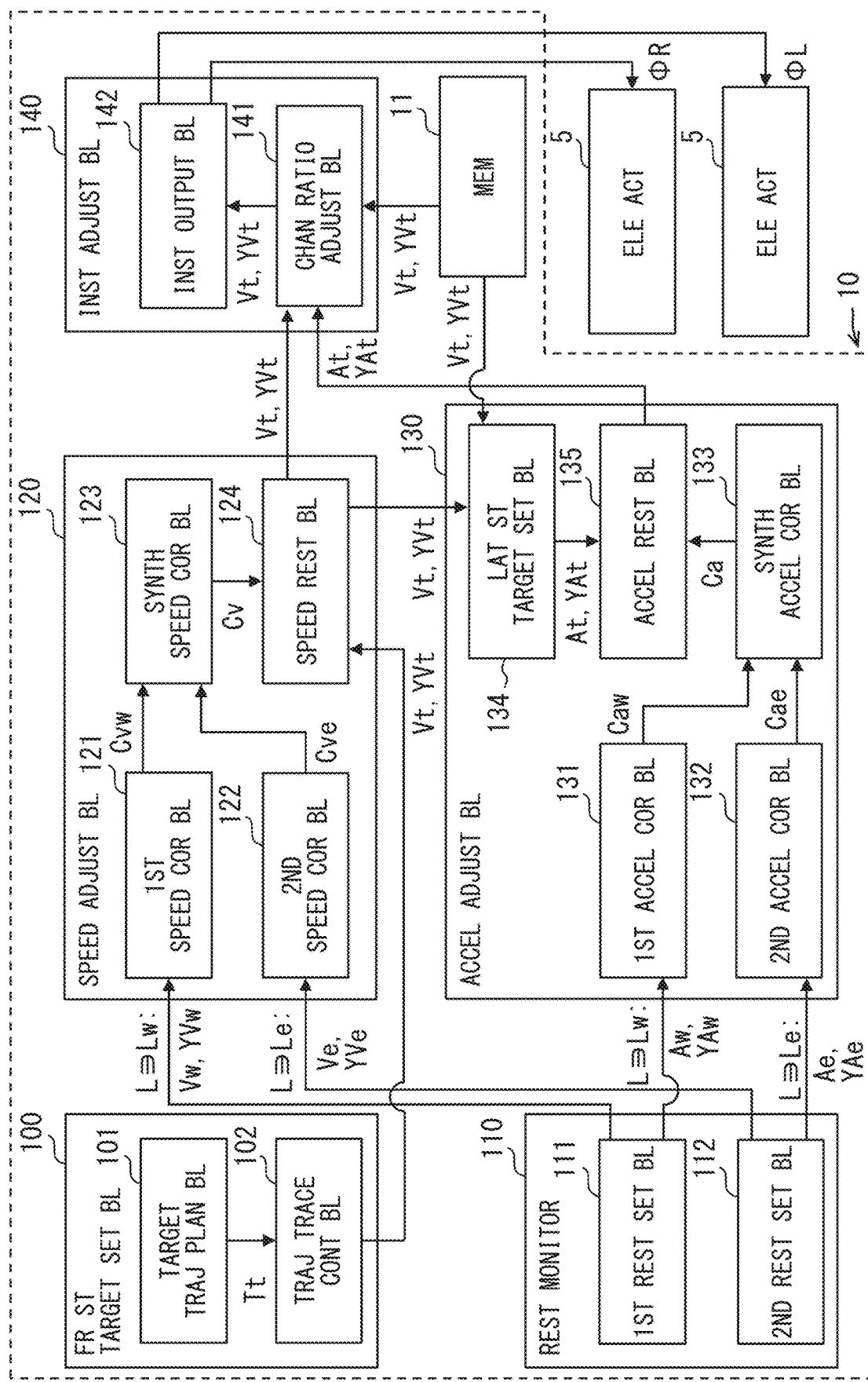
FIG. 3 is a block diagram illustrating a function configuration of a control system according to an embodiment.

In the control system 10, the processor 12 executes a plurality of instructions included in a control program stored in the memory 11 to control the autonomous travelling robot 1. Thereby, the control system 10 constructs a plurality of function blocks for controlling the autonomous travelling robot 1. As shown in FIG. 3, the plurality of functional blocks constructed in the control system 10 include a front stage target set block 100, a restriction monitor block 110, a speed adjust block 120, an acceleration adjust block 130, and an instruction adjust block 140.

The front stage target set block 100 has a target trajectory plan block 101 and a trajectory trace control block 102 as a plurality of sub-function blocks.

The target trajectory plan block 101 plans a target trajectory Tt in order to control the autonomous travelling robot 1 along the target trajectory Tt. At this time, the target trajectory plan block 101 estimates the self-state quantity of the autonomous travelling robot 1 based on various information acquired by the sensor system 6. Here, the self-state quantity includes the self-position of the autonomous travelling robot 1. The self-state quantity may also include at least one of, for example, the speed and the yaw angle of the autonomous travelling robot 1. The target trajectory Tt means a target running trajectory that defines such time-series changes in self-state quantities for the autonomous travelling robot 1.

The trajectory trace control block 102 takes over the latest target trajectory Tt from the target trajectory plan block 101. At the same time, the trajectory trace control block 102 acquires the latest self-state quantity representing the actual trajectory of the autonomous travelling robot 1 based on various information acquired by the sensor system 6. Therefore, the trajectory trace control block 102 executes trajectory trace control so that the actual trajectory of the autonomous travelling robot 1 follows the target trajectory Tt. Through such trajectory trace control, the trajectory trace control block 102 converts the deviation between the self-state quantities defined by the actual trajectory and the target trajectory Tt through feedback control, thereby setting the target speed Vt and the target yaw rate YVt to follow the target trajectory Tt.

The restriction monitor block 110 has a first restriction set block 111 and a second restriction set block 112 as a plurality of sub-function blocks.

The first restriction set block 111 estimates the latest maximum electric power that can be supplied from the battery 4 by monitoring the power storage state (that is, charging state) in the battery 4. Therefore, the first restriction set block 111 sets and monitors the running restriction L, which is the restriction according to the maximum electric power, as the power restriction Lw. Here, as the power restriction Lw, the first restriction set block 111 determines the maximum speed Vw, the maximum yaw rate YVw, the maximum acceleration Aw, and the maximum yaw rate change ratio YAw for the autonomous travelling robot 1. At this time, each physical quantity of motion Vw, YVw, Aw, YAw, which defines the power restriction Lw, is determined by at least one type of, for example, a map, a table, a function expression and the like stored in the memory 11 so as to define a correlation with the maximum power. Here, with respect to the yaw rate, which is the yaw angular speed, the yaw rate change ratio, which is the yaw angular acceleration, is defined as the time rate of change of the yaw rate.

The second restriction set block 112 sets and monitors a running restriction L depending on the running environment of the autonomous travelling robot 1 as an environment restriction Le. Here, the environment restriction Le is defined by the restriction according to the environment factor related to the running environment in which the autonomous travelling robot 1 is operated, such as space information, traffic volume information, weather information, obstacle information, time zone information, and light/dark information. Therefore, as the environment restriction Le, the second restriction set block 112 sets the maximum speed Ve, the maximum yaw rate YVe, the maximum acceleration Ae, and the maximum yaw rate change ratio Ae for the autonomous travelling robot 1 so as to correspond to each physical quantity of motion of the power restriction Lw. At this time, each physical quantity of motion Ve, YVe, Ae, YAe defining the environment restriction Le is determined from at least one type of, for example, a map, a table, and a function expression stored in the memory 11 so as to define the correlation with the environment factor.

The speed adjust block 120 has a first speed correlation block 121, a second speed correlation block 122, a synthesis speed correlation block 123, and a speed restriction block 124 as a plurality of sub-function blocks.

Figure 4:
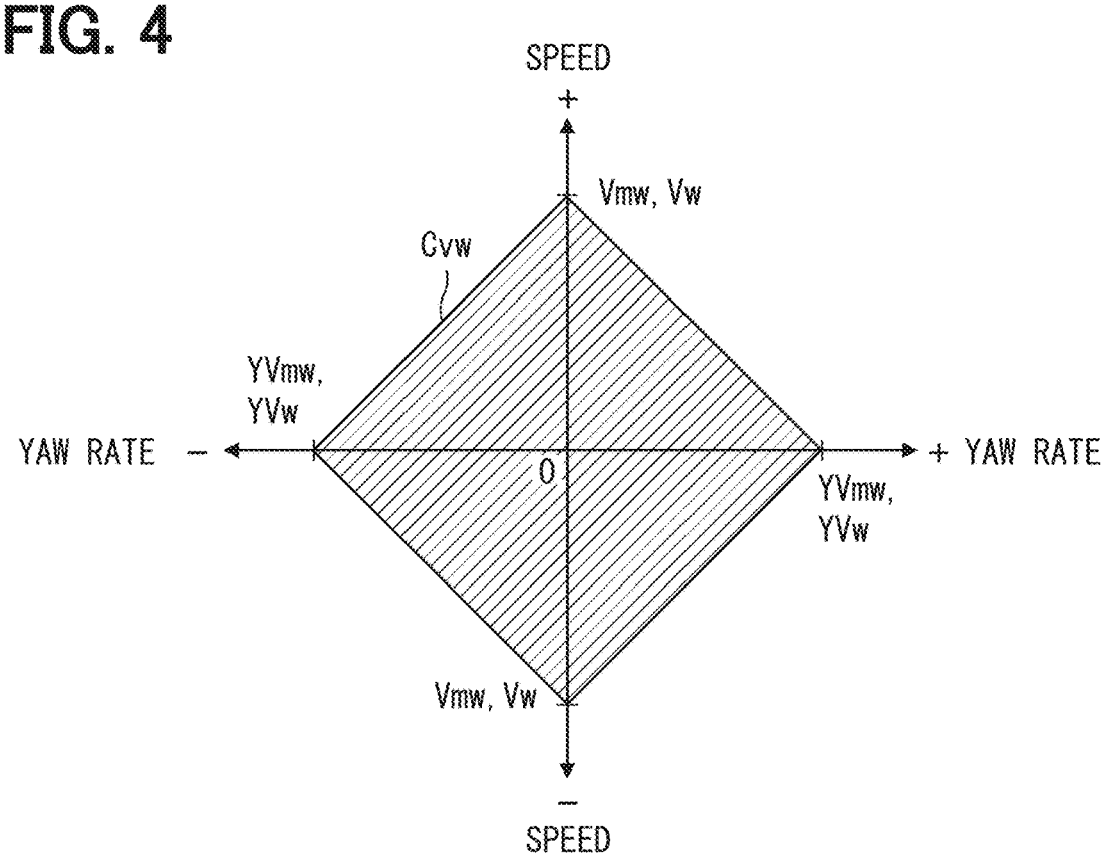
FIG. 4 is a graph explaining a first speed correlation block according to an embodiment.

The first speed correlation block 121 inherits the maximum speed Vw and the maximum yaw rate YVw from the first restriction set block 111 as the latest power restriction Lw. Therefore, as shown in FIG. 4 with diagonal hatching rising to the right, the first speed correlation block 121 sets the correlation range of the speed and the yaw rate in which the condition of the power restriction Lw is not met as the first speed correlation range Cvw. At this time, the positive and negative values of the speed are defined such that the speed is positive when the robot 1 runs straight and/or turns in the forward direction, the speed is negative when the robot 1 runs straight and turns in the backward direction, and the zero value of the speed meaning that the robot 1 stops running is sandwiched between the positive speed and the negative speed. On the other hand, the positive and negative values of the yaw rate are defined such that the yaw rate is positive when the robot 1 turns right, the yaw rate is negative when the robot 1 turns left, and the zero value of the yaw rate meaning that the robot 1 runs straight or stops running is sandwiched between the positive yaw rate and the negative yaw rate. Alternatively, the opposite direction of turning may be defined.

Under these definitions, the first speed correlation block 121 sets the maximum straight-running speed Vmw, which is the maximum speed during straight running, to the positive and negative maximum speeds Vw. At the same time, the first speed correlation block 121 sets the maximum turning yaw rate YVmw, which is the maximum yaw rate during turning, to the positive and negative maximum yaw rates YVw. Based on these settings, the first speed correlation block 121 acquires, as the first speed correlation range Cvw, a range in which the absolute value of the speed is equal to or less than the maximum straight-running speed Vmw and the absolute value of the yaw rate is equal to or less than the maximum turning yaw rate YVmw. At this time, among the correlation points of the speed and the yaw rate within the first speed correlation range Cvw, the correlation points of a boundary line with the outside of the first speed correlation range Cvw where the condition of the power restriction Lw is satisfied (see the contour line in FIG. 4) means the restriction point group of the first speed correlation range Cvw. Therefore, in the example of FIG. 4, the restriction point group forming the boundary of the first speed correlation range Cvw is defined such that as the absolute value of the speed gradually decreases from the maximum straight-running speed Vmw, the absolute value of the yaw rate gradually increases up to the maximum turning yaw rate YVmw.

Figure 5:
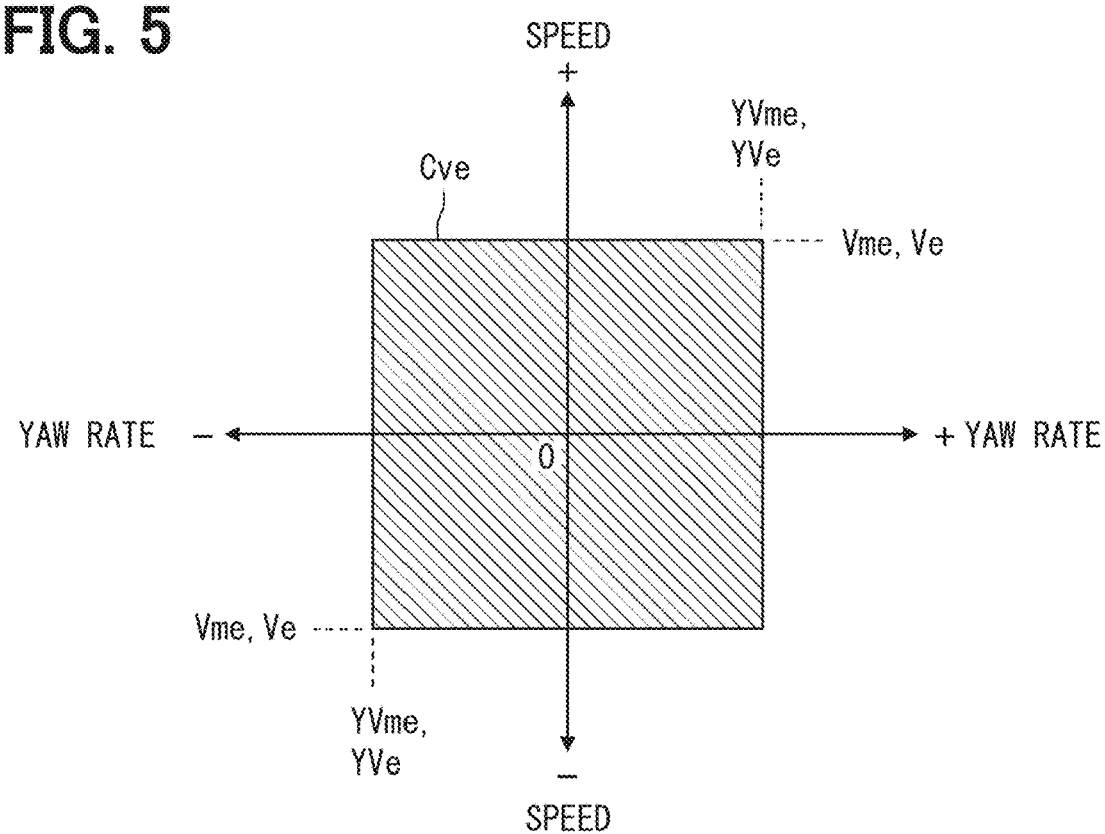
FIG. 5 is a graph explaining a second speed correlation block according to an embodiment.

The second speed correlation block 122 shown in FIG. 3 inherits the maximum speed Ve and maximum yaw rate YVe from the second restriction set block 112 as the latest environment restriction Le. Therefore, as shown in FIG. 5 with diagonal hatching rising to the left, the second speed correlation block 122 sets the correlation range of the speed and the yaw rate in which the condition of the environment restriction Le is not met as the second speed correlation range Cve. At this time, the positive/negative sign of the speed is defined in the same way as in the case of the first speed correlation range Cvw.

Under these definitions, the second speed correlation block 122 sets the maximum straight-running speed Vme, which is the maximum speed during straight running, to the positive and negative maximum speeds Ve. At the same time, the second speed correlation block 122 sets the maximum turning yaw rate YVme, which is the maximum yaw rate during turning, to the positive and negative maximum yaw rates YVe. Based on these settings, the second speed correlation block 122 acquires, as the second speed correlation range Cvwe, a range in which the absolute value of the speed is equal to or less than the maximum straight-running speed Vme and the absolute value of the yaw rate is equal to or less than the maximum turning yaw rate YVme. At this time, among the correlation points of the speed and the yaw rate within the second speed correlation range Cve, the correlation points of a boundary line with the outside of the second speed correlation range Cve where the condition of the environment restriction Le is satisfied (see the contour line in FIG. 5) means the restriction point group of the second speed correlation range Cve. Therefore, in the example of FIG. 5, the restriction point group constituting the boundary of the second speed correlation range Cve is set such that the absolute value of the speed maintains to be the maximum straight-running speed Vme, and the absolute value of the yaw rate maintains to be the maximum turning yaw rate YVme.

Figure 6:
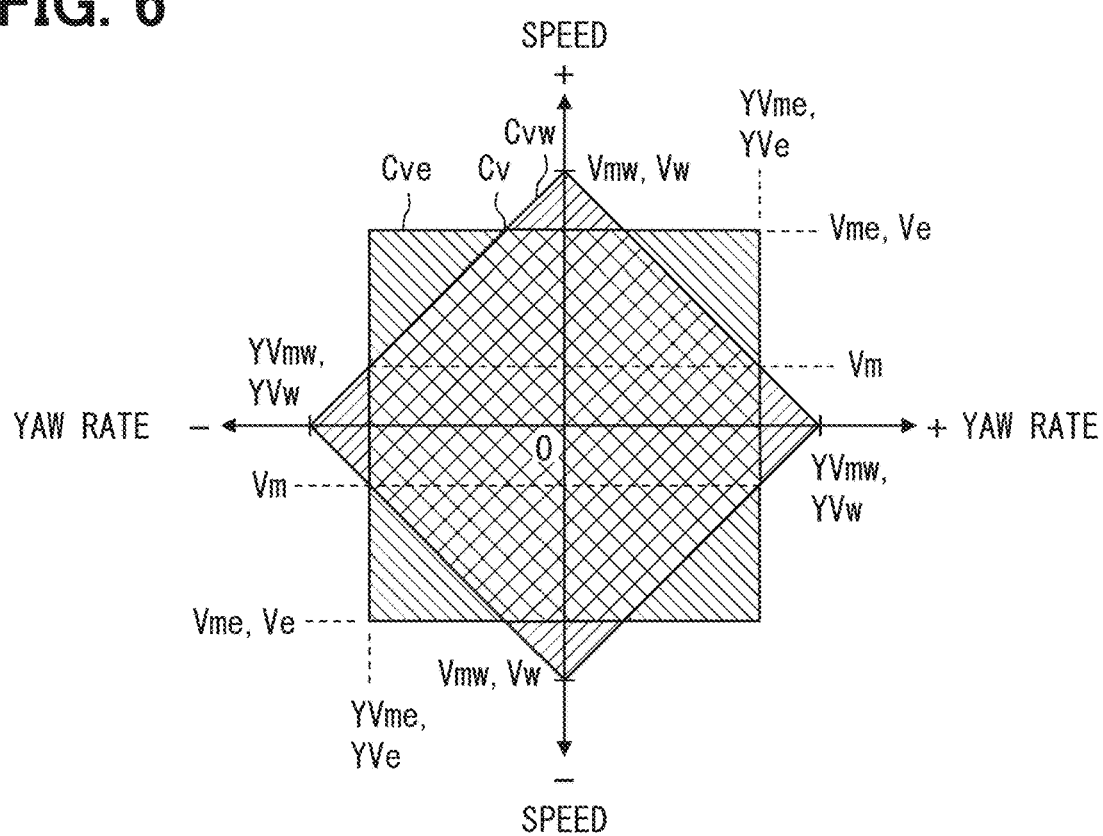
FIG. 6 is a graph explaining a synthesis speed correlation block according to an embodiment.

The synthesis speed correlation block 123 shown in FIG. 3 inherits the latest first speed correlation range Cvw from the first speed correlation block 121. At the same time, the synthesis speed correlation block 123 inherits the latest second speed correlation range Cve from the second speed correlation block 122. Therefore, as shown with cross hatching in FIG. 6, the synthesis speed correlation block 123 sets a range which is a product set (i.e., a common set Cvw∩Cve) of correlation points of the first speed correlation range Cvw and the second speed correlation range Cve as a synthesis speed correlation range Cv which is obtained by synthesizing these correlation ranges Cvw and Cve. At this time, in particular, the synthesis speed correlation range Cv of this embodiment is adjusted to be a range in which the maximum turning speed Vm, which is the maximum speed during turning with the minimum turning radius, is restrictioned to be smaller than the straight-running maximum speed Vme in the second speed correlation range Cve. The synthesis speed correlation range Cv determined in this manner defines such that the internal correlation points are the allowance target for which the condition is not satisfied, and the external correlation points are the restriction target for which the condition is satisfied, with respect to the running restriction L including the electric power restriction Lw and the environment restriction Le.

The speed restriction block 124 shown in FIG. 3 inherits the latest synthesis speed correlation range Cv from the synthesis speed correlation block 123. At the same time, the speed restriction block 124 inherits the target speed Vt and target yaw rate YVt from the trajectory trace control block 102 as the latest target values. Therefore, the speed restriction block 124 adjusts the target speed Vt and target yaw rate YVt so that the actual speed and the actual yaw rate of the autonomous travelling robot 1 are controlled within the synthesis speed correlation range Cv.

Figure 7:
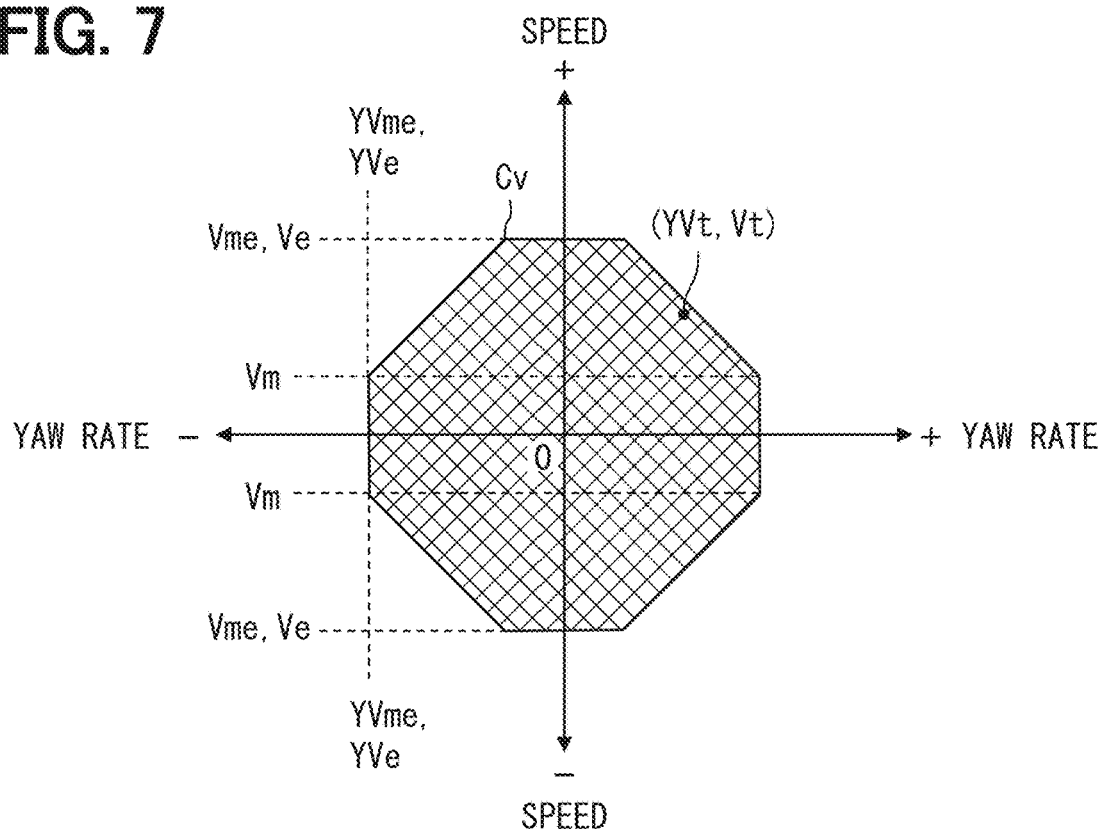
FIG. 7 is a graph explaining a speed restriction block according to an embodiment.
Figure 8:
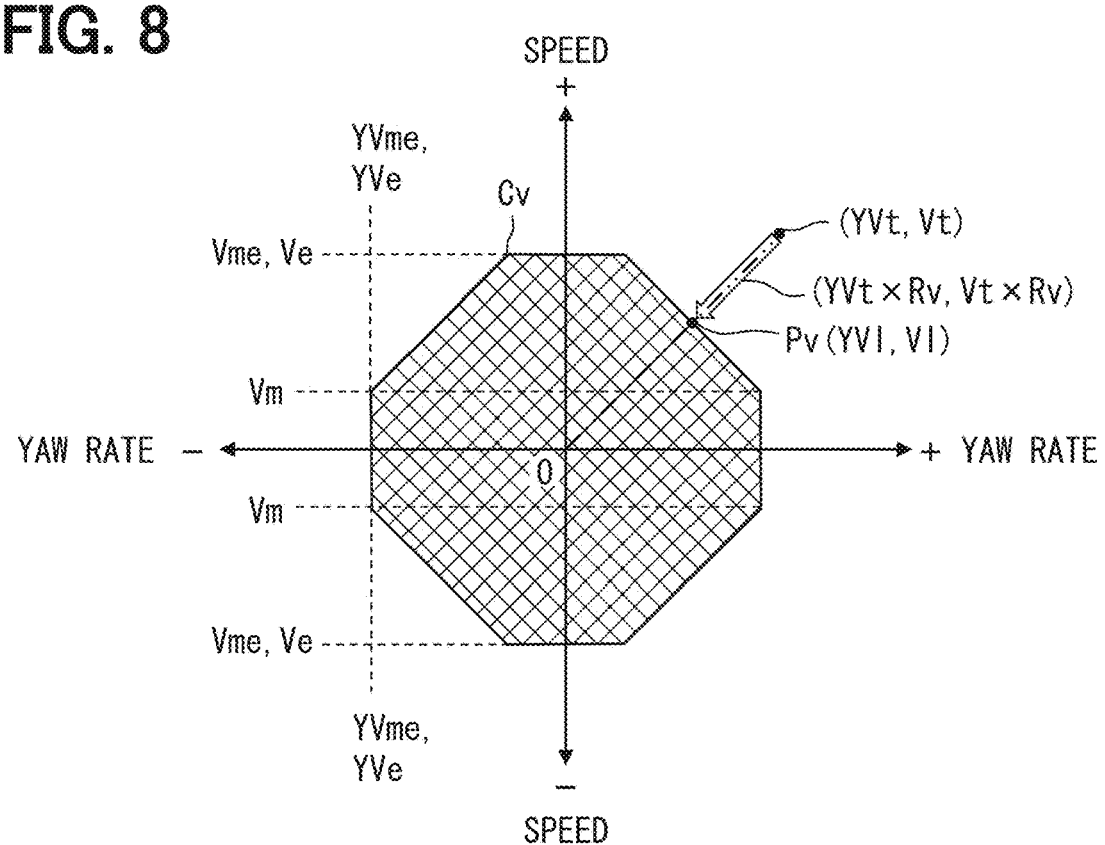
FIG. 8 is a graph explaining a speed restriction block according to an embodiment.

Specifically, as shown in FIG. 7, when the correlation point between the target speed Vt and the target yaw rate YVt is disposed in the synthesis speed correlation range Cv, and the condition of the running restriction L is not satisfied, the speed restriction block 124 maintains each of these target values Vt and YVt. On the other hand, as shown in FIG. 8, when the correlation point between the target speed Vt and the target yaw rate YVt is disposed outside the synthesis speed correlation range Cv, and the condition of the running restriction L is satisfied, the speed restriction block 124 adjusts each of the target speed Vt and the target yaw rate YVt to reduce. At this time, by the reduction adjustment, the target speed Vt and the target yaw rate YVt are multiplied by a common restriction ratio Rv of less than 1, respectively, and thereby become values VI and YVI that provide the restriction point Pv within the synthesis speed correlation range Cv, respectively. The restriction values VI, YVI of each target value Vt, YVt due to such restrictions provide the restriction point Pv at the intersection between the boundary line with the outside of the synthesis speed correlation range Cv, and the virtual line extended from the correlation point of each target value Vt, YVt before the restriction to the zero point.

The acceleration adjust block 130 shown in FIG. 3 includes a first acceleration correlation block 131, a second acceleration correlation block 132, a synthesis acceleration correlation block 133, a latter stage target set block 134, and an acceleration restriction block 135 as a plurality of sub-functional blocks.

Figure 9:
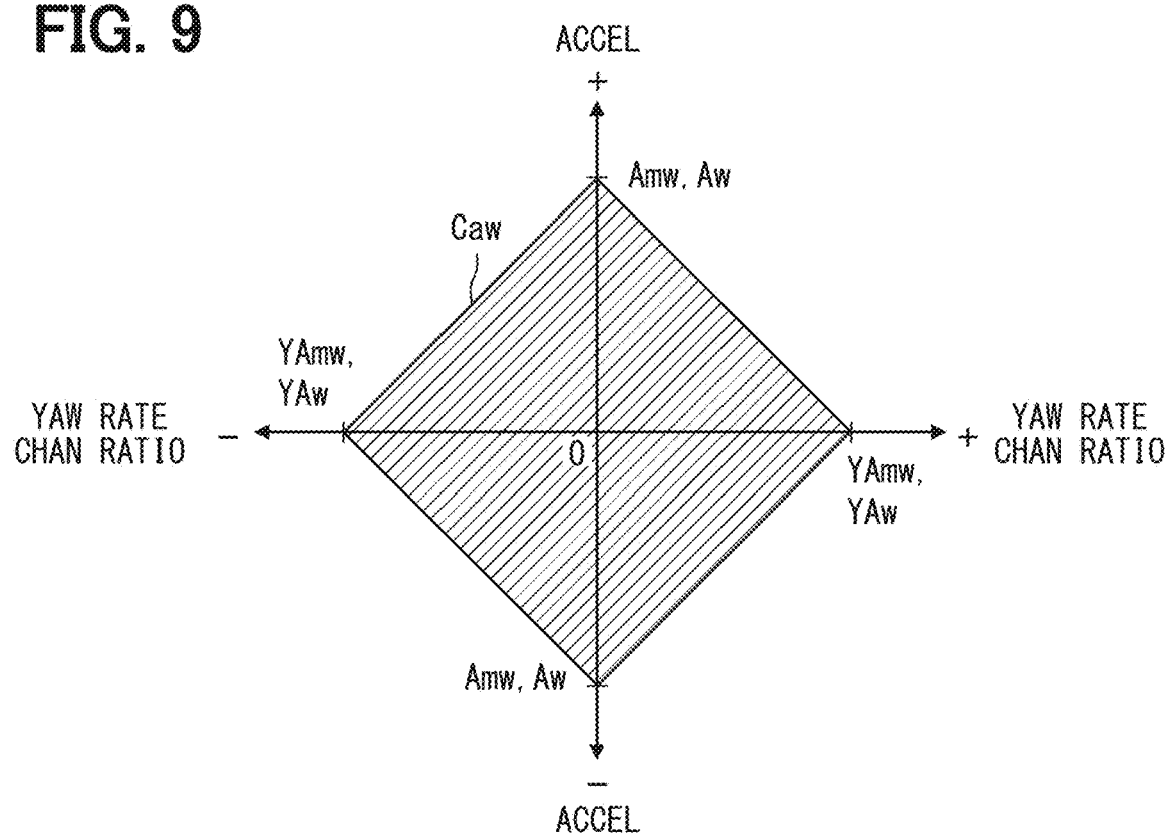
FIG. 9 is a graph explaining a first acceleration correlation block according to an embodiment.

The first acceleration correlation block 131 inherits the maximum acceleration Aw and the maximum yaw rate change ratio YAw from the first restriction set block 111 as the latest electric power restriction Lw. Therefore, as shown in FIG. 9 with diagonal hatching rising to the right, the first acceleration correlation block 131 sets the correlation range of the acceleration and the yaw rate in which the condition of the electric power restriction Lw is not met as the first acceleration correlation range Caw. At this time, the positive and negative values of the acceleration are defined such that the acceleration is positive when the robot 1 runs straight and/or turns in the forward direction, the acceleration is negative when the robot 1 runs straight and turns in the backward direction, and the zero value of the acceleration meaning that the robot 1 stops running is sandwiched between the positive acceleration and the negative acceleration. On the other hand, the positive and negative values of the yaw rate change ratio are defined such that the yaw rate change ratio is positive when the robot 1 turns right, the yaw rate change ratio is negative when the robot 1 turns left, and the zero value of the yaw rate change ratio meaning that the robot 1 runs straight or stops running is sandwiched between the positive yaw rate change ratio and the negative yaw rate change ratio. Alternatively, the opposite direction of turning may be defined.

Under these definitions, the first acceleration correlation block 131 sets the straight-running maximum acceleration Amw, which is the maximum acceleration during straight-running travel, to the positive and negative maximum accelerations Aw. At the same time, the first acceleration correlation block 131 sets the turning maximum yaw rate change ratio YAmw, which is the maximum yaw rate change ratio during turning, to the positive and negative maximum yaw rate change ratios YAw. Based on these settings, the first acceleration correlation block 131 acquires the range in which the absolute value of acceleration is below the straight-running maximum acceleration Amw and the absolute value of the yaw rate change ratio is below the turning maximum yaw rate change ratio YAmw as a first acceleration correlation range Caw. At this time, among the correlation points of the speed and the yaw rate change ratio within the first acceleration correlation range Caw, the correlation point group constituting a boundary line with the outside of the first acceleration correlation range Caw where the condition of the electric power restriction Lw is satisfied (see the contour line in FIG. 9) means the restriction point group of the first acceleration correlation range Caw. Therefore, in the example of FIG. 9, the restriction point group constituting the boundary of the first acceleration correlation range Caw are defined such that the absolute value of the yaw rate change ratio gradually increases up to the maximum turning yaw rate change ratio YAmw as the absolute value of the acceleration gradually decreases from the straight-running maximum acceleration Amw.

Figure 10:
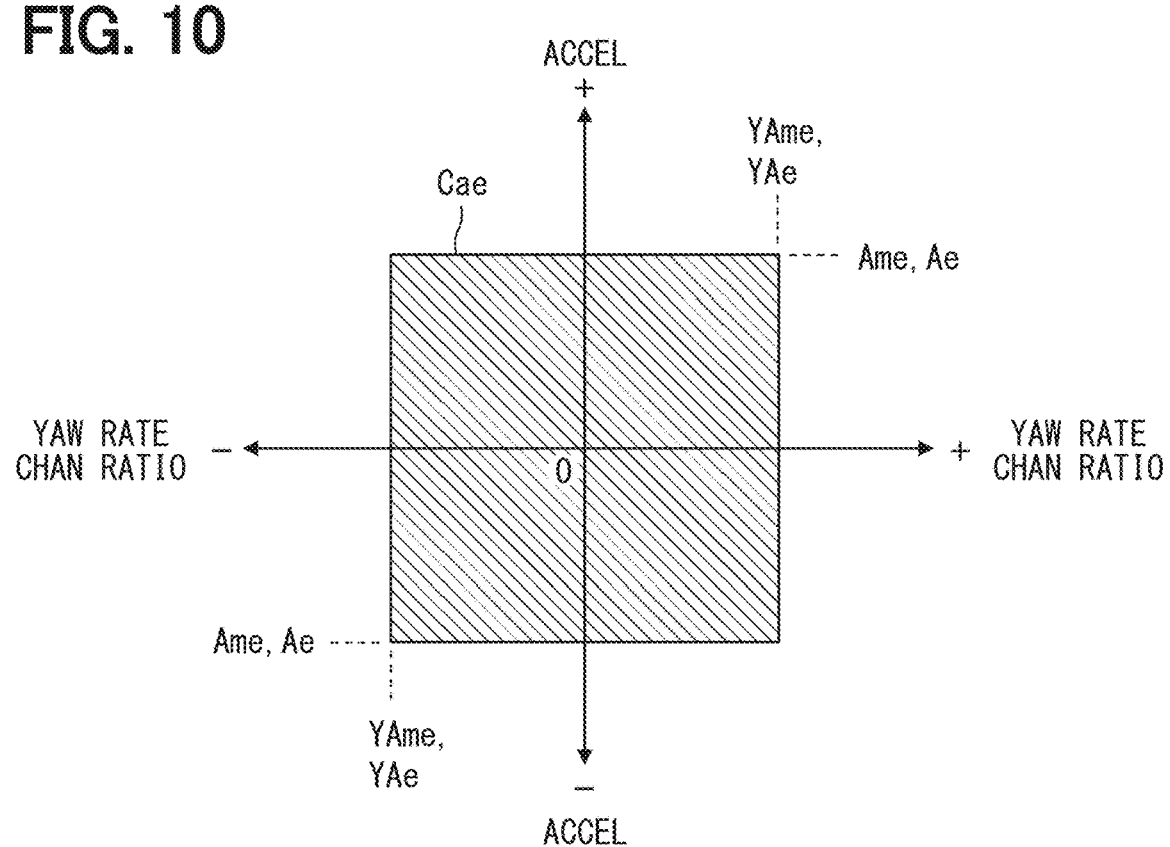
FIG. 10 is a graph explaining a second acceleration correlation block according to an embodiment.

The second acceleration correlation block 132 shown in FIG. 3 inherits the maximum acceleration Ae and the maximum yaw rate change ratio YAe from the second restriction set block 112 as the latest environment restriction Le. Therefore, as shown in FIG. 10 with diagonal hatching rising to the left, the second acceleration correlation block 132 sets the correlation range of the acceleration and the yaw rate change ratio in which the condition of the environment restriction Le is not met as the second acceleration correlation range Cae. At this time, the positive/negative sign of the acceleration is defined in the same way as in the case of the first acceleration correlation range Caw.

Under these definitions, the second acceleration correlation block 132 sets the straight-running maximum acceleration Ame, which is the maximum acceleration during straight-running travel, to the positive and negative maximum accelerations Ae. At the same time, the second acceleration correlation block 132 sets the turning maximum yaw rate change ratio YAme, which is the maximum yaw rate change ratio during turning, to the positive and negative maximum yaw rate change ratios YAe. Based on these settings, the second acceleration correlation block 132 acquires the range in which the absolute value of acceleration is below the straight-running maximum acceleration Ame and the absolute value of the yaw rate change ratio is below the turning maximum yaw rate change ratio YAme as a second acceleration correlation range Cae. At this time, among the correlation points of the speed and the yaw rate change ratio within the second acceleration correlation range Cae, the correlation point group constituting a boundary line with the outside of the second acceleration correlation range Cae where the condition of the environment restriction Le is satisfied (see the contour line in FIG. 10) means the restriction point group of the second acceleration correlation range Cae. Therefore, in the example of FIG. 10, the restriction point group forming the boundary of the second acceleration correlation range Cae are defined such that the absolute value of acceleration maintains to be the straight-running maximum acceleration Ame, and the absolute value of the yaw rate change ratio maintains to be the turning maximum yaw rate change ratio YAme.

Figure 11:
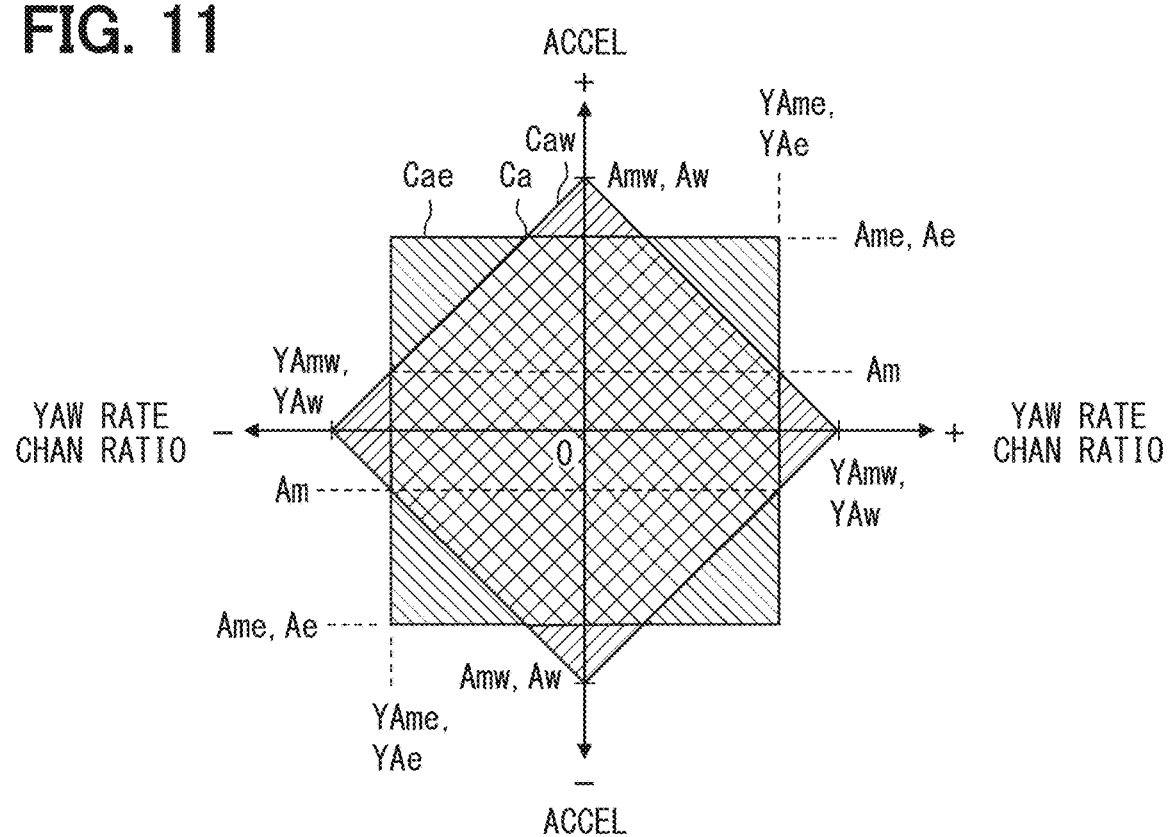
FIG. 11 is a graph explaining a synthesis acceleration correlation block according to an embodiment.

The synthesis acceleration correlation block 133 shown in FIG. 3 inherits the latest first acceleration correlation range Caw from the first acceleration correlation block 131. At the same time, the synthesis acceleration correlation block 133 inherits the latest second acceleration correlation range Cae from the second acceleration correlation block 132. Therefore, as shown with cross hatching in FIG. 11, the synthesis acceleration correlation block 133 sets a range providing a product set (i.e., a common set Caw∩Cae) of correlation points between the first acceleration correlation range Caw and the second acceleration correlation range Cae as a synthesis acceleration correlation range Ca obtained by synthesizing the correlation ranges Caw and Cae. At this time, in particular, the synthesis acceleration correlation range Ca of this embodiment is adjusted to be in a range in which the maximum turning acceleration Am, which is the maximum acceleration during turning with the minimum turning radius, is restricted to be smaller than the straight-running maximum acceleration Ame in the second acceleration correlation range Cae. The synthesis acceleration correlation range Ca determined in this manner defines such that the internal correlation points are the allowance target for which the condition is not satisfied, and the external correlation points are the restriction target for which the condition is satisfied, with respect to the running restriction L including the electric power restriction Lw and the environment restriction Le.

The latter stage target set block 134 shown in FIG. 3 inherits the target speed Vt and the target yaw rate YVt from the speed restriction block 124 as the latest target values. At the same time, the latter stage target set block 134 obtains from the memory 11 the target speed Vt and the target yaw rate YVt, each of which the change ratio is adjusted by the instruction adjust block 140 as described later in the previous control period, which is the past with respect to the latest current control period. Therefore, the latter stage target set block 134 sets the target acceleration At and the target yaw rate change ratio YAt as the latest target value for following the target trajectory Tt by differentiating the difference between the latest and past target values Vt, YVt for each type of value with respect to time.

The acceleration restriction block 135 inherits the latest synthesis acceleration correlation range Ca from the synthesis acceleration correlation block 133. At the same time, the acceleration restriction block 135 inherits the target acceleration At and the target yaw rate change ratio YAt from the latter stage target set block 134 as the latest target values. Therefore, the acceleration restriction block 135 further adjusts the target acceleration At and the target yaw rate change ratio YAt so that the actual acceleration and the actual yaw rate change ratio of the autonomous travelling robot 1 are controlled within the synthesis acceleration correlation range Ca.

Figure 12:
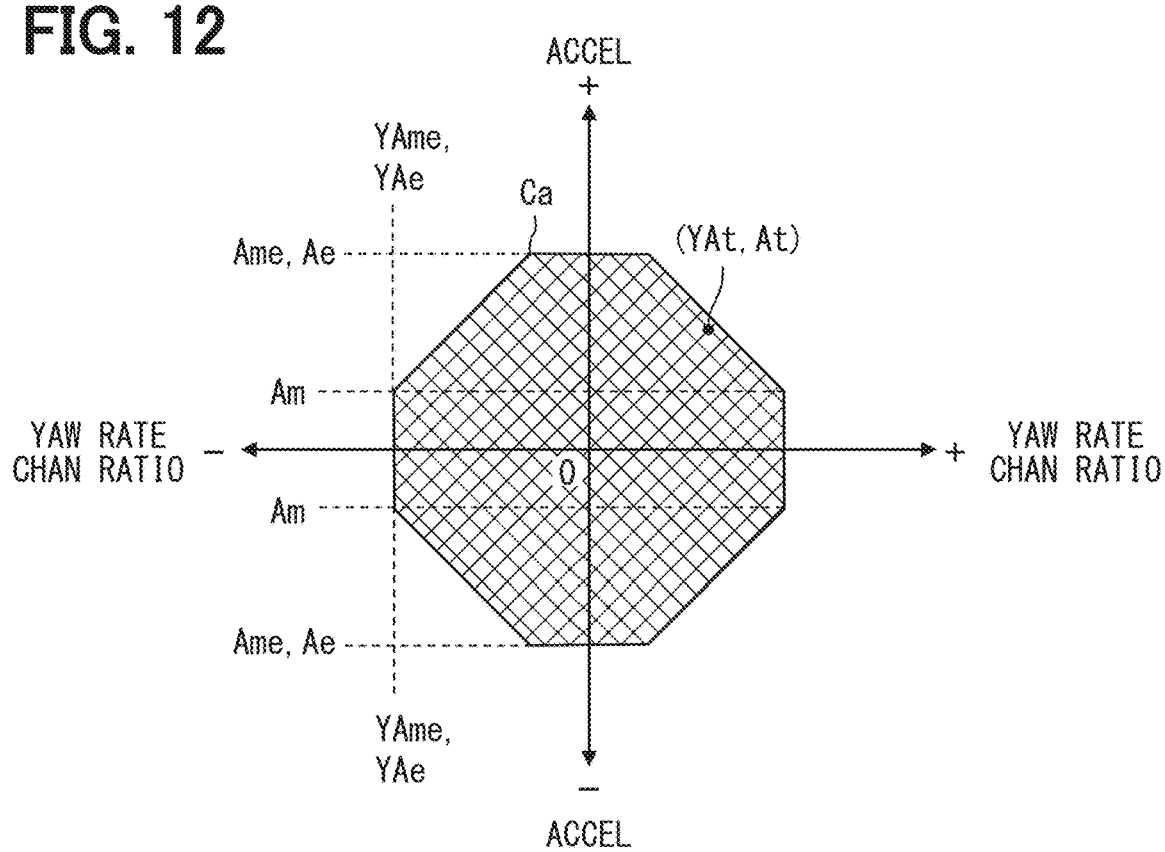
FIG. 12 is a graph explaining an acceleration restriction block according to an embodiment.
Figure 13:
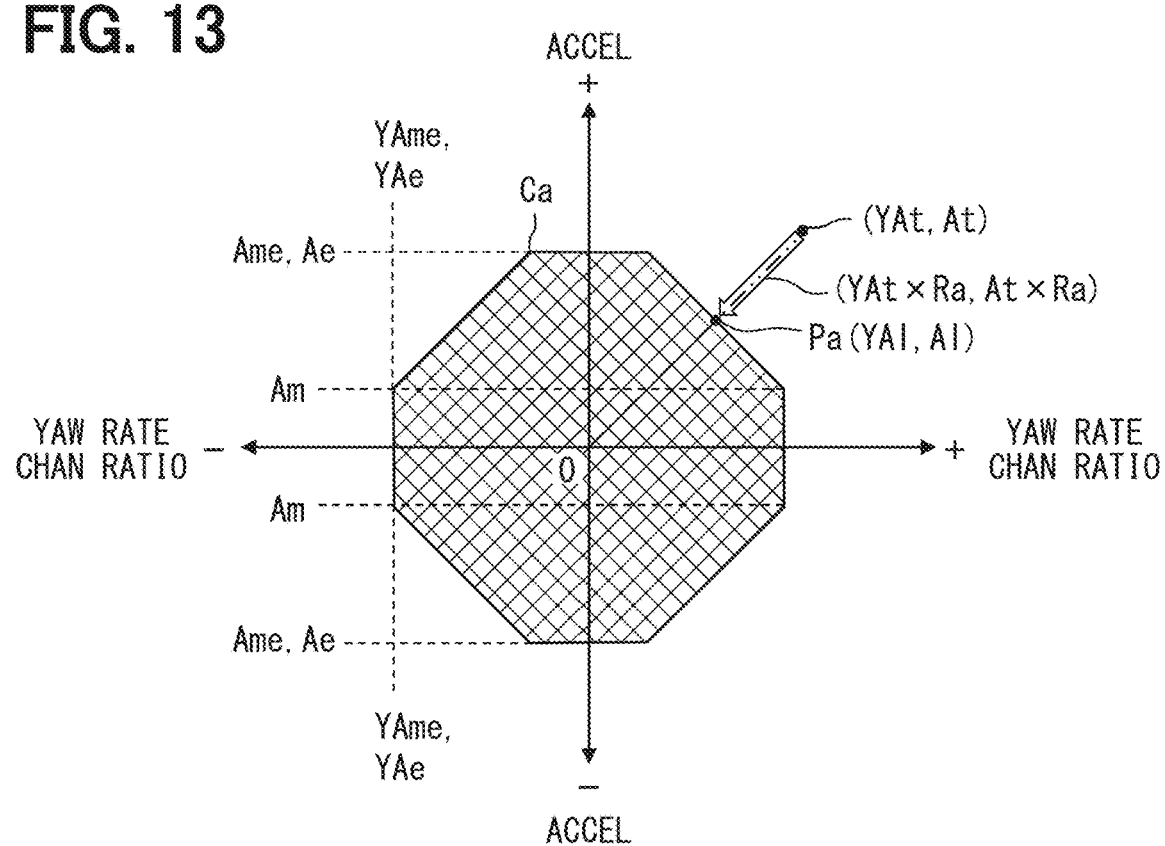
FIG. 13 is a graph explaining an acceleration restriction block according to an embodiment.

Specifically, as shown in FIG. 12, when the correlation point between the target acceleration At and the target yaw rate change ratio YAt is disposed within the synthesis acceleration correlation range Ca, and the condition of the running restriction L is not satisfied, the acceleration restriction block 135 maintains each of the target values At and YAt. On the other hand, as shown in FIG. 13, when the correlation point between the target acceleration At and the target yaw rate change ratio YAt is disposed outside the synthesis acceleration correlation range Ca, and the condition of the running restriction L is satisfied, the acceleration restriction block 135 adjusts each of the target values At and YAt to decrease. At this time, by the reduction adjustment, the target acceleration At and the target yaw rate change ratio YAt are restricted to be the values Al, YAl for providing the restriction point Pa within the synthesis acceleration correlation range Ca by multiplying each of them by a mutually common restriction ratio Ra of less than 1. The restriction values Al, YAl of each target value At, YAt due to such restrictions provide the restriction point Pa at the intersection between the boundary line with the outside of the synthesis acceleration correlation range Ca and the virtual line extended from the correlation point of each target value At, YAt before the restriction to the zero point.

The instruction adjust block 140 shown in FIG. 3 includes a change ratio adjust block 141 and an instruction output block 142 as a plurality of sub-functional blocks.

The change ratio adjust block 141 inherits the latest target speed Vt and the latest target yaw rate YVt from the speed restriction block 124. At the same time, the change ratio adjust block 141 inherits the latest target acceleration At and the latest target yaw rate change ratio YAt from the acceleration restriction block 135. Furthermore, the change ratio adjust block 141 acquires from the memory 11 the target speed Vt and the target yaw rate YVt whose change ratio are adjusted by the block 141 in the previous control period which is the past with respect to the latest current control period. Therefore, as shown in FIG. 3, the change ratio adjust block 141 adjusts again the target speed Vt and the target yaw ratio YVt so that the time change rate between the latest and past values of each of the target speed Vt and the target yaw rate YVt to match the latest target acceleration At and latest target yaw rate change ratio YAt, respectively.

Here, the change ratio adjust block 141 may inherit the latest restriction ratio Ra from the acceleration restriction block 135 instead of acquiring the past target values Vt, YVt from the memory 11. At this time, when the target acceleration At and the target yaw rate change ratio YAt are adjusted to decrease in the acceleration restriction block 135, the change ratio adjust block 141 inherits the restriction ratio Ra whose value is less than 1. On the other hand, when the target acceleration At and the target yaw rate change ratio YAt are maintained in the acceleration restriction block 135, the change ratio adjust block 141 may inherit the restriction ratio Ra having a value of 1. The change ratio adjust block 141 that has inherited the restriction ratio Ra in this manner can readjust the latest target values Vt, YVt, respectively, based on the restriction ratio Ra and the latest target values At, YAt.

The instruction output block 142 inherits from the change ratio adjust block 141 the latest target speed Vt and the latest target yaw rate YVt whose change rate have been adjusted. Therefore, the instruction output block 142 sets the target rotation speed OR of the right drive wheel 30 and the target rotation speed OL of the left drive wheel 30, respectively, so as to satisfy the following expressions 1 and 2 based on the target speed Vt and the target yaw rate YVt. Here, in the expressions 1 and 2, d is the distance from the vertical center line of the vehicle body 2 to each drive wheel 30, and r is the radius of each drive wheel 30. As described above, the instruction output block 142 converts the target rotation speeds OR and OL of each drive wheel 30 into a current instruction value for the corresponding electric actuator 5, and then outputs the current instruction value.

$$\Phi R = (Vt + d \cdot YVt)/r \quad \text{(Expression 1)}$$

$$\Phi L = (Vt + d \cdot YVt)/r \quad \text{(Expression 2)}$$

Figure 14:
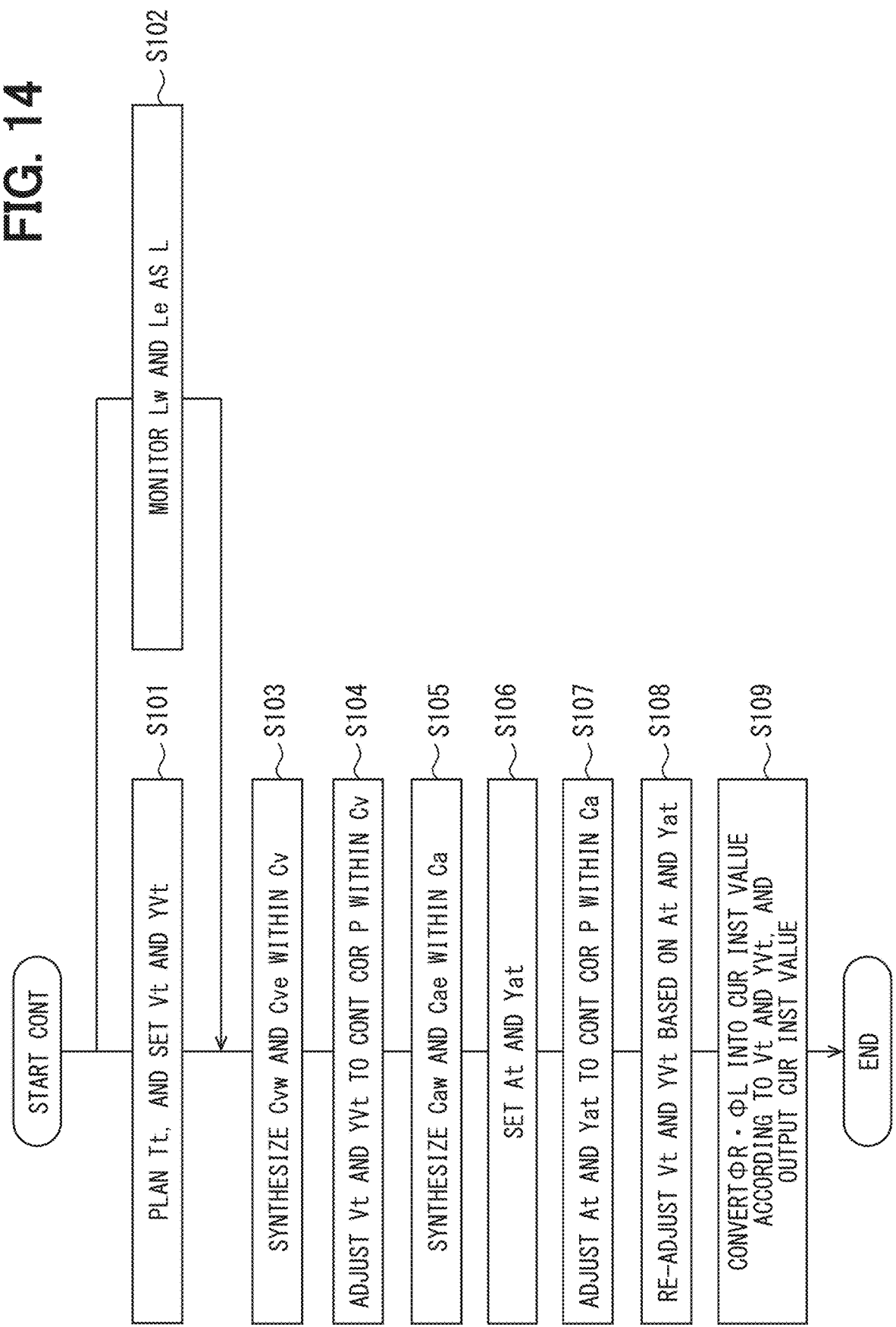
FIG. 14 is a flowchart showing a control flow according to an embodiment.

The control method for controlling the autonomous travelling robot 1 by the control system 10 in cooperation with the blocks 100, 110, 120, 130, and 140 described so far is executed according to the control flow shown in FIG. 14. This control flow is repeatedly executed according to the control period while the autonomous travelling robot 1 is activated. Here, in this flow, "S" means steps of the process executed by instructions included in the control program.

In S101, the front stage target set block 100 plans a target trajectory Tt of the autonomous travelling robot 1 using the target trajectory plan block 101, and sets the target speed Vt and the target yaw rate YVt for controlling the actual trajectory along the target trajectory Tt using the trajectory trace control block 102. In S102 parallel to S101, the restriction monitor block 110 monitors the electric power restriction Lw and the environment restriction Le as the running restriction L by the first and second restriction set blocks 111 and 112, respectively.

In S103 following S101 and S102, the speed adjust block 120 synthesizes the first and second speed correlation ranges Cvw and Cve acquired by the first and second speed correlation blocks 121 and 122, respectively, into a synthesis speed correlation range Cv using the synthesis speed correlation block 123. In S104 following S103, the speed adjust block 120 adjusts the target values Vt, YVt using the speed restriction block 124 so that the correlation point of the target speed Vt and the target yaw rate YVt is controlled within the synthesis speed correlation range Cv.

In S105 following S104, the acceleration adjust block 130 synthesizes the first and second acceleration correlation ranges Caw and Cae obtained by the first and second acceleration correlation blocks 131 and 132, respectively, into a synthesis acceleration correlation range Ca by the synthesis acceleration correlation block 133. In S106 following S105, the acceleration adjust block 130 sets the target acceleration At and the target yaw rate change ratio YAt using the latter stage target set block 134. In S107 following S106, the acceleration adjust block 130 adjusts the target values At and YAt using the acceleration restriction block 135 so that the correlation point between the target acceleration At and the target yaw rate change ratio YAt is controlled within the synthesis acceleration correlation range Ca.

In S108 following S107, the instruction adjust block 140 adjusts again the target speed Vt and the target yaw rate Yt based on the target acceleration At and the target yaw rate change ratio YAt using the change ratio adjust block 141. In S109 following S108, the instruction adjust block 140 converts the target rotational speeds OR, OL of each drive wheel 30 set according to the target speed Vt and the target yaw rate YVt by the instruction output block 142, into a current instruction value for each electric actuator 5 by the same block 142.

(Functions and Effects)

The functions and effects in the present embodiment described above will be explained below.

According to the present embodiment, by monitoring the running restriction L including the electric power restriction Lw of the battery 4, the maximum turning speed Vm with the minimum turning radius is restricted to be smaller than the maximum straight-running speed Vme depending on the satisfaction of the condition of the running restriction L. According to this, even if the electric power restriction Lw occurs, it is possible to generate the rotation speed difference between each drive wheel 30 so that an actual trajectory of the autonomous travelling robot 1 follows the target trajectory Tt, while outputting a restricted speed when turning. Therefore, it is possible to suppress the trajectory deviation of the autonomous travelling robot 1 regardless of the electric power supply state of the battery 4.

According to the present embodiment, the actual speed and the actual yaw rate of the autonomous traveling robot 1 are controlled within the synthesis speed correlation range Cv in which the maximum turning speed Vm with the minimum turning radius is smaller than the maximum straight-running speed Vme as the correlation range of the speed and the yaw rate in which the condition of the running restriction L is not met. According to this, a rotation speed difference is generated in each drive wheel 30 so that the actual trajectory based on the actual speed and the actual yaw rate within the synthesis speed correlation range Cv follows the target trajectory Tt, and further, a restricted speed is output when turning. Therefore, it is possible to ensure the reliability of the effect of suppressing the trajectory deviation of the autonomous travelling robot 1.

In this embodiment, a target speed Vt and a target yaw rate YVt for following the target trajectory Tt are set for the autonomous travelling robot 1. Therefore, according to the present embodiment, the target speed Vt and the target yaw rate YVt at the correlation point outside the synthesis speed correlation range Cv where the condition of the running restriction L is satisfied are adjusted to be the values VI, YVI that give the restriction point Pv within the synthesis speed correlation range Cv using a common restriction ratio Rv. According to this, the relative ratio Vt/YVt between the target speed Vt and the target yaw rate YVt is substantially maintained before and after adjustment, so that the arrival point of the autonomous mobile according to the actual speed and the actual yaw rate within the synthesis speed correlation range Cv can be overlapped with the target trajectory Tt. Therefore, during turning, a restricted speed can be output while generating a rotation speed difference in each drive wheel 30 so that the actual trajectory based on the actual speed and the actual yaw rate follows the target trajectory Tt. Therefore, it is possible to increase the reliability of the effect of suppressing the trajectory deviation of the autonomous travelling robot 1.

According to the present embodiment, by monitoring the running restriction L including the electric power restriction Lw of the battery 4, the maximum turning acceleration Am with the minimum turning radius is restricted to be smaller than the maximum straight-running acceleration Ame depending on the satisfaction of the condition of the running restriction L. According to this, even if the electric power restriction Lw occurs, it is possible to generate the rotation speed difference between each drive wheel 30 so that an actual trajectory of the autonomous travelling robot 1 follows the target trajectory Tt, while outputting a restricted acceleration when turning. Therefore, it is possible to suppress the trajectory deviation of the autonomous travelling robot 1 regardless of the electric power supply state of the battery 4.

According to the present embodiment, the actual acceleration and the actual yaw rate change rate of the autonomous travelling robot 1 are controlled, as the correlation range of the acceleration and the yaw rate change ratio in which the condition of the running restriction L is not met, within the synthesis acceleration correlation range Ca in which the maximum turning acceleration Am with the minimum turning radius is smaller than the straight-running maximum acceleration Ame. According to this, a rotation speed difference is generated in each drive wheel 30 so that the actual trajectory based on the actual acceleration and the actual yaw rate change ratio within the synthesis acceleration correlation range Ca follows the target trajectory Tt, and further, a restricted acceleration is output when turning. Therefore, it is possible to ensure the reliability of the effect of suppressing the trajectory deviation of the autonomous travelling robot 1.

In this embodiment, a target acceleration At and a target yaw rate change ratio YAt for following the target trajectory Tt are set for the autonomous travelling robot 1. Therefore, according to the present embodiment, the target acceleration At and the target yaw rate change ratio YAt at the correlation point outside the synthesis acceleration correlation range Ca, where the condition of the running restriction L is satisfied, are adjusted to be the values Al and YAl that give the restriction point Pa within the synthesis acceleration correlation range Ca using a common restriction ratio Ra. According to this, the relative ratio At/YAt between the target acceleration At and the target yaw rate change ratio YAt is substantially maintained before and after the adjustment, so that the arrival point of the autonomous travelling robot 1 according to the actual acceleration and the actual yaw rate change ratio within the synthesis acceleration correlation range Ca can be overlapped with the target trajectory Tt. Therefore, during turning, a restricted acceleration can be output while generating a rotation speed difference in each drive wheel 30 so that the actual trajectory based on the actual acceleration and the actual yaw rate change ratio follows the target trajectory Tt. Therefore, it is possible to increase the reliability of the effect of suppressing the trajectory deviation of the autonomous travelling robot 1.

According to this embodiment, the running restriction L that includes not only the electric power restriction Lw of the battery 4 but also the environment restriction Le that depends on the running environment of the autonomous travelling robot 1 are monitored. According to this, even when the condition of the environment restriction Le is met, a rotation speed difference is generated in each drive wheel 30 so that the actual trajectory of the autonomous travelling robot 1 follows the target trajectory Tt, and the restricted speed and the restricted acceleration can be output when turning. Therefore, it is also possible to suppress the trajectory deviation of the autonomous travelling robot 1 regardless of the running environment.

Other Embodiments

Although one embodiment has been described, the present disclosure should not be limited to the above embodiment and may be applied to various other embodiments within the scope of the present disclosure.

The dedicated computer of the control system 10 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

Figure 15:
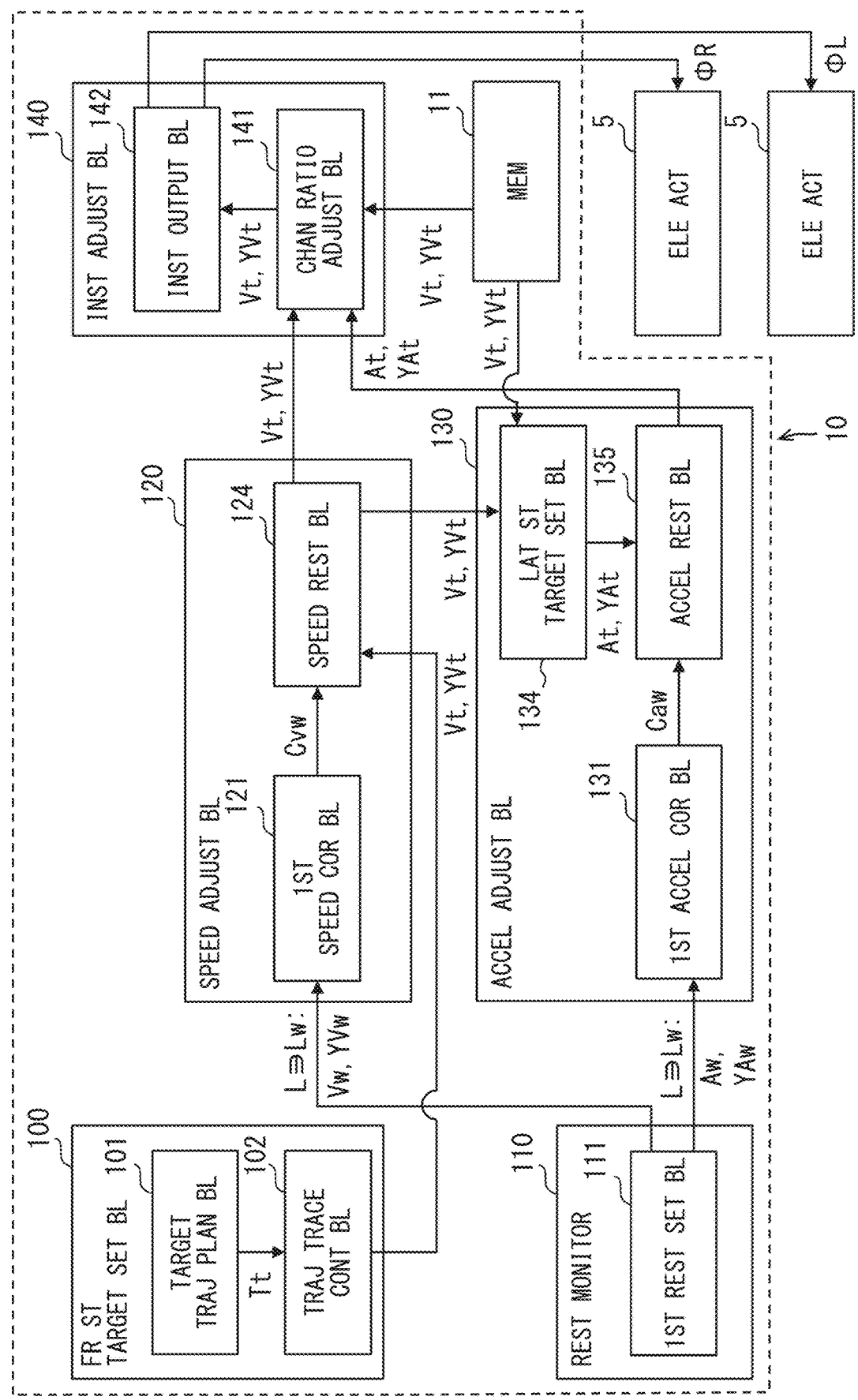
FIG. 15 is a block diagram showing the function configuration of a control system according to a modification.

In the modified example shown in FIG. 15, the second restriction set block 112 may not be constructed. In this case, in the adjust blocks 120, 130, the correlation blocks 122, 123, 132, 133 are also not constructed, and in the restriction blocks 124, 135, the target values Vt, Y, At, YAt may be adjusted within the correlation ranges Cvw, Caw instead of the correlation ranges Cv, Ca. In this case, the correlation ranges Cvw and Caw may be adjusted to a range in which the maximum turning speed Vm and the maximum turning acceleration Am with the minimum turning radius are smaller than the maximum straight-running speed Vmw and the maximum straight-running acceleration Amw, respectively. Here, when turning with the minimum turning radius, the drive wheels 30 on one side are controlled at the maximum rotation speed in either the positive or negative direction, while the drive wheels 30 on the opposite side are controlled at the maximum rotation speed in the other direction. As a result, the center of gravity position of the autonomous travelling robot 1 is substantially maintained, and the minimum turning radius, the maximum turning speed Vm, and the maximum turning acceleration Am all become substantially zero values. Furthermore, the control flow may be changed depending on these modification features.

Figure 16:
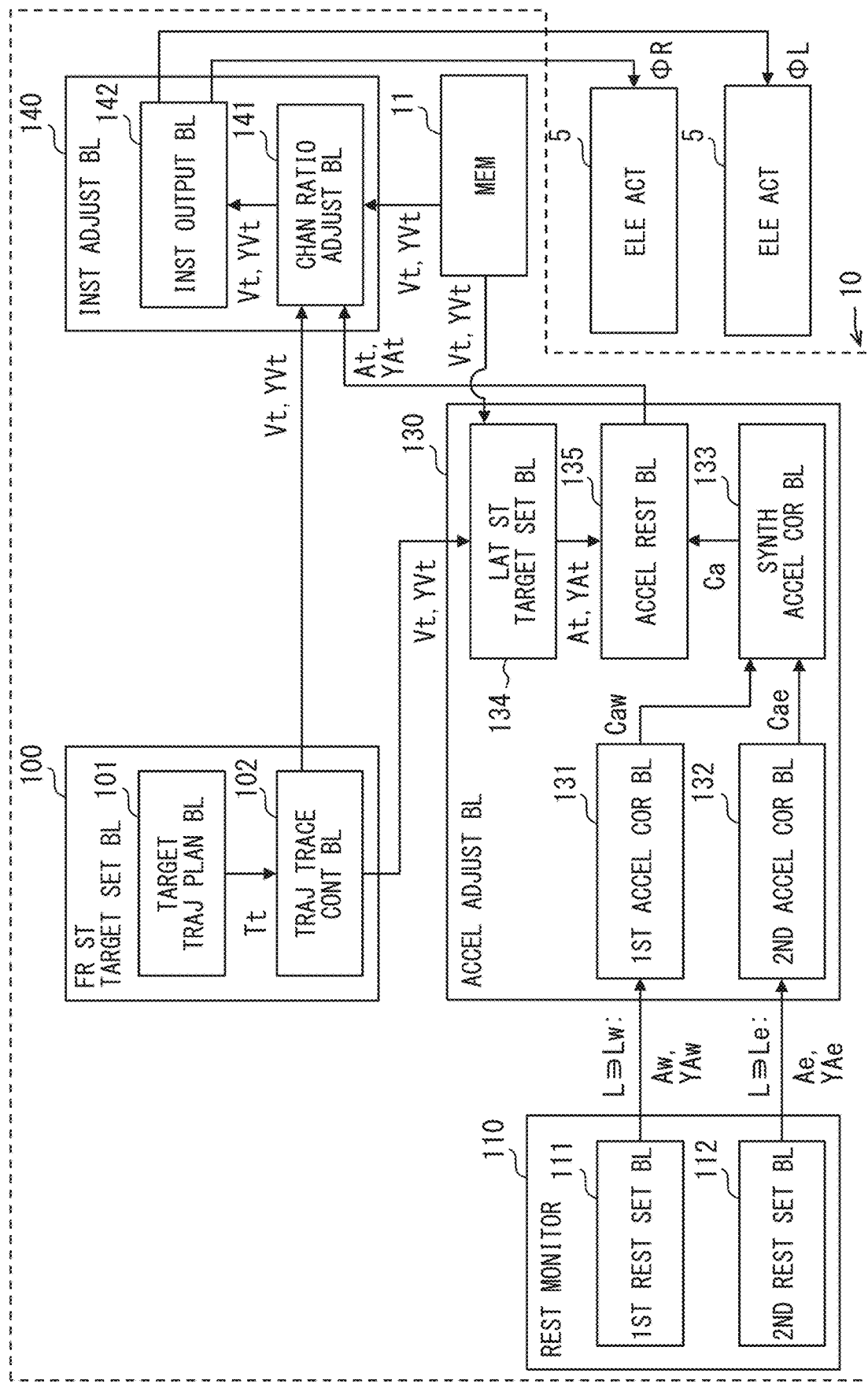
FIG. 16 is a block diagram showing the function configuration of a control system according to a modification.

In a modification example as shown in FIG. 16, the speed adjust block 120 may not be constructed. In this case, in the acceleration adjust block 130, the latest target acceleration At and the latest target yaw rate change ratio YAt may be set by time differentiation using the target values Vt, YVt from the trajectory trace control block 102 in the latter stage target set block 134. Further, in the instruction adjust block 140 in this case, the target values Vt, YVt from the trajectory trace control block 102 may be readjusted in the change ratio adjust block 141. Furthermore, the control flow may be changed depending on these modification features.

Figure 17:
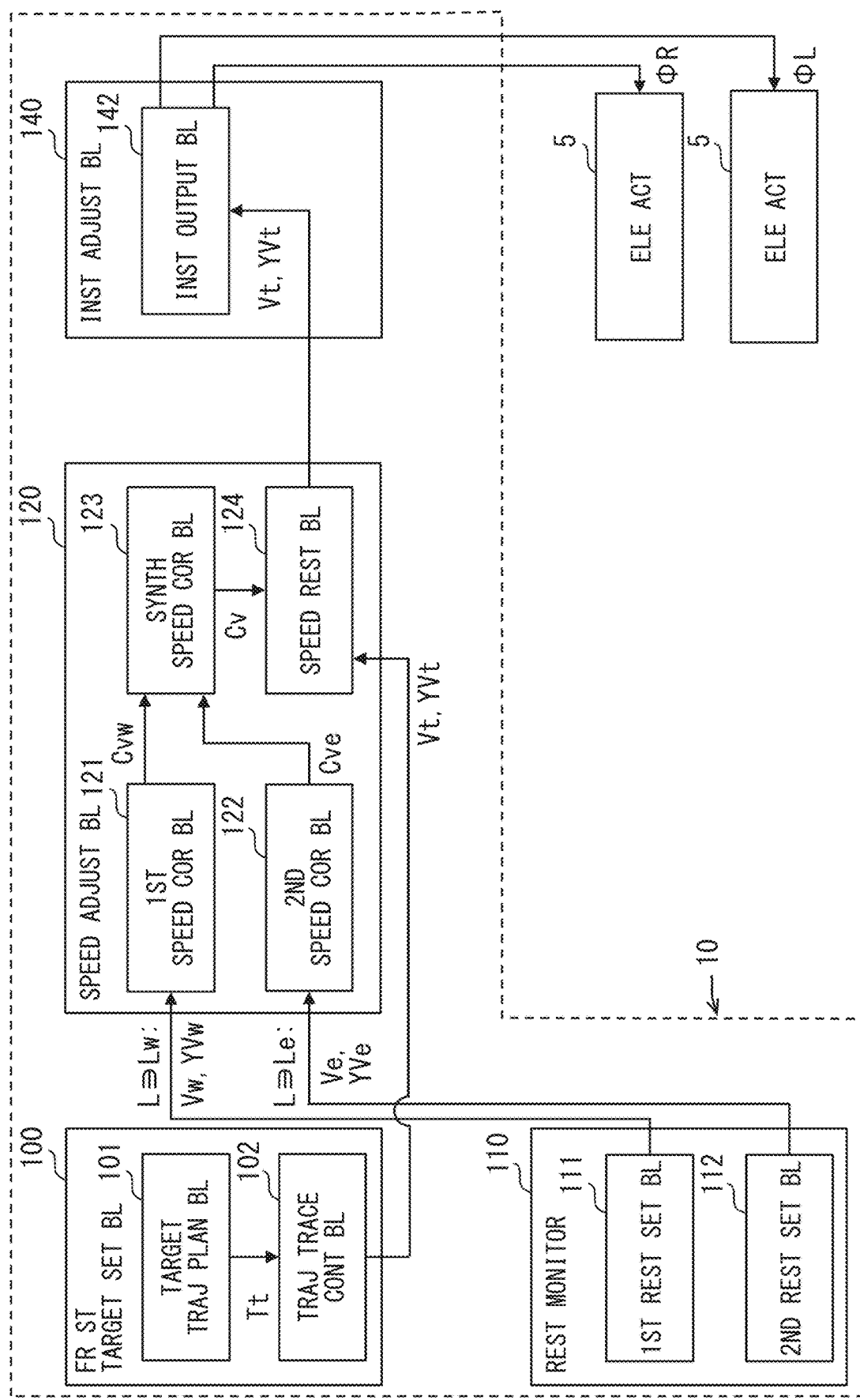
FIG. 17 is a block diagram showing the function configuration of a control system according to a modification.

In the modification shown in FIG. 17, the acceleration adjust block 130 may not be constructed. In this case, in the instruction adjust block 140, the change ratio adjust block 141 is also not constructed, and the target rotation speeds OR, OL may be set according to the target values Vt, YVt from the speed restriction block 124 in the instruction output block 142. Furthermore, the control flow may be changed depending on these modification features.

In addition to the above-described embodiments and modifications, the present disclosure may be implemented in forms of a processing circuit (such as a processing ECU) or a semiconductor device (such as a semiconductor chip) as the control device mountable on an autonomous travelling robot 1 and including at least one processor 12 and at least one memory 11.

The present embodiments may further provide the following features.

According to an example, a control device controls an autonomous travelling robot, which switches between a straight running and turning according to a rotation speed difference between a pair of drive wheels driven by individual electric actuators supplied electric power from a battery, along a target trajectory. The control device is configured to be mounted on the autonomous travelling robot and includes: a processor.

The processor is configured to execute:
monitoring a running restriction that includes an electric power restriction of the battery; and
restricting a maximum turning speed, which is a maximum speed when turning with a minimum turning radius, to be smaller than a maximum straight-running speed, which is a maximum speed when straight-running, according to an establishment of a condition in the running restriction.

The restricting of the maximum turning speed includes: controlling an actual speed and an actual yaw rate of the autonomous travelling robot within a speed correlation range in which the maximum turning speed is smaller than the maximum straight-running speed as a correlation range of the speed and the yaw rate in which the condition of the running restriction is not established.

According to an example, a control device controls an autonomous travelling robot, which switches between a straight running and turning according to a rotation speed difference between a pair of drive wheels driven by individual electric actuators supplied electric power from a battery, along a target trajectory. The control device is configured to be mounted on the autonomous travelling robot and includes: a processor.

The processor is configured to execute:
monitoring a running restriction that includes an electric power restriction of the battery; and
restricting a maximum turning acceleration, which is a maximum acceleration when turning with a minimum turning radius, to be smaller than a maximum straight-running acceleration, which is a maximum acceleration when straight-running, according to an establishment of a condition in the running restriction.

The restricting of the maximum turning acceleration includes: controlling an actual acceleration and an actual yaw rate change ratio of the autonomous travelling robot within an acceleration correlation range in which the maximum turning acceleration is smaller than the maximum straight-running acceleration as a correlation range of the acceleration and the yaw rate change ratio in which the condition of the running restriction is not established.

According to an example, a non-transitory computer readable storage medium includes instructions being executed by a computer. The instructions includes a computer-implemented method for controlling an autonomous travelling robot, which switches between a straight running and turning according to a rotation speed difference between a pair of drive wheels driven by individual electric actuators supplied electric power from a battery, along a target trajectory.

The instructions including:
monitoring a running restriction that includes an electric power restriction of the battery; and
restricting a maximum turning speed, which is a maximum speed when turning with a minimum turning radius, to be smaller than a maximum straight-running speed, which is a maximum speed when straight-running, according to an establishment of a condition in the running restriction.

The restricting of the maximum turning speed includes: controlling an actual speed and an actual yaw rate of the autonomous travelling robot within a speed correlation range in which the maximum turning speed is smaller than the maximum straight-running speed as a correlation range of the speed and the yaw rate in which the condition of the running restriction is not established.

According to an example, a non-transitory computer readable storage medium includes instructions being executed by a computer. The instructions includes a computer-implemented method for controlling an autonomous travelling robot, which switches between a straight running and turning according to a rotation speed difference between a pair of drive wheels driven by individual electric actuators supplied electric power from a battery, along a target trajectory.

The instructions includes:
monitoring a running restriction that includes an electric power restriction of the battery; and
restricting a maximum turning acceleration, which is a maximum acceleration when turning with a minimum turning radius, to be smaller than a maximum straight-running acceleration, which is a maximum acceleration when straight-running, according to an establishment of a condition in the running restriction.

The restricting of the maximum turning acceleration includes: controlling an actual acceleration and an actual yaw rate change ratio of the autonomous travelling robot within an acceleration correlation range in which the maximum turning acceleration is smaller than the maximum straight-running acceleration as a correlation range of the acceleration and the yaw rate change ratio in which the condition of the running restriction is not established.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control system for controlling an autonomous travelling robot, which switches between a straight running and turning according to a rotation speed difference between a pair of drive wheels driven by individual electric actuators supplied electric power from a battery, along a target trajectory, the control system comprising: a processor, wherein:
the processor is configured to execute:
monitoring a running restriction that includes an electric power restriction of the battery; and
restricting a maximum turning speed, which is a maximum speed when turning with a minimum turning radius, to be smaller than a maximum straight-running speed, which is a maximum speed when straight-running, according to an establishment of a condition in the running restriction, wherein:
the restricting of the maximum turning speed includes:
controlling an actual speed and an actual yaw rate of the autonomous travelling robot within a speed correlation range in which the maximum turning speed is smaller than the maximum straight-running speed as a correlation range of the speed and the yaw rate in which the condition of the running restriction is not established.

2. The control system according to claim 1, wherein:
the processor is configured to execute: setting a target speed and a target yaw rate for the autonomous travelling robot to follow the target trajectory; and
the restricting of the maximum turning speed includes: adjusting the target speed and the target yaw rate at a correlation point, disposed outside the speed correlation range in which the condition of the running restriction is established, to be values that give a restriction point in the speed correlation range using a common restriction ratio.

3. The control system according to claim 1, wherein:
the processor is configured to execute: restricting a maximum turning acceleration, which is a maximum acceleration when turning with the minimum turning radius, to be smaller than a maximum straight-running acceleration, which is a maximum acceleration when straight-running, according to the establishment of the condition in the running restriction.

4. A control system for controlling an autonomous travelling robot, which switches between a straight running and turning according to a rotation speed difference between a pair of drive wheels driven by individual electric actuators supplied electric power from a battery, along a target trajectory, the control system comprising: a processor, wherein:
the processor is configured to execute:
monitoring a running restriction that includes an electric power restriction of the battery; and
restricting a maximum turning acceleration, which is a maximum acceleration when turning with a minimum turning radius, to be smaller than a maximum straight-running acceleration, which is a maximum acceleration when straight-running, according to an establishment of a condition in the running restriction, wherein:
the restricting of the maximum turning acceleration includes: controlling an actual acceleration and an actual yaw rate change ratio of the autonomous travelling robot within an acceleration correlation range in which the maximum turning acceleration is smaller than the maximum straight-running acceleration as a correlation range of the acceleration and the yaw rate change ratio in which the condition of the running restriction is not established.

5. The control system according to claim 4, wherein:
the processor is configured to execute: setting a target acceleration and a target yaw rate change ratio for the autonomous travelling robot to follow the target trajectory; and
the restricting of the maximum turning acceleration includes: adjusting the target acceleration and the target yaw rate change ratio at a correlation point, disposed outside the acceleration correlation range in which the condition of the running restriction is established, to be values that give a restriction point in the acceleration correlation range using a common restriction ratio.

6. The control system according to claim 4, wherein:
the monitoring of the establishment of the condition in the running restriction includes:
monitoring the establishment of the condition in the running restriction having the electric power restriction and an environment restriction depending on a running environment of the autonomous travelling robot.

7. A control method for controlling an autonomous travelling robot, which switches between a straight running and turning according to a rotation speed difference between a pair of drive wheels driven by individual electric actuators supplied electric power from a battery, along a target trajectory, the control method executed by a processor and comprising:
monitoring a running restriction that includes an electric power restriction of the battery; and
restricting a maximum turning speed, which is a maximum speed when turning with a minimum turning radius, to be smaller than a maximum straight-running speed, which is a maximum speed when straight-running, according to an establishment of a condition in the running restriction, wherein:
the restricting of the maximum turning speed includes: controlling an actual speed and an actual yaw rate of the autonomous travelling robot within a speed correlation range in which the maximum turning speed is smaller than the maximum straight-running speed as a correlation range of the speed and the yaw rate in which the condition of the running restriction is not established.

8. A control method for controlling an autonomous travelling robot, which switches between a straight running and turning according to a rotation speed difference between a pair of drive wheels driven by individual electric actuators supplied electric power from a battery, along a target trajectory, the control method executed by a processor and comprising:
monitoring a running restriction that includes an electric power restriction of the battery; and
restricting a maximum turning acceleration, which is a maximum acceleration when turning a minimum turning radius, to be smaller than a maximum straight-running acceleration, which is a maximum acceleration when straight-running, according to an establishment of a condition in the running restriction, wherein:
the restricting of the maximum turning acceleration includes: controlling an actual acceleration and an actual yaw rate change ratio of the autonomous travelling robot within an acceleration correlation range in which the maximum turning acceleration is smaller than the maximum straight-running acceleration as a correlation range of the acceleration and the yaw rate change ratio in which the condition of the running restriction is not established.

* * * * *